US012439237B2

(12) United States Patent
Srivastava et al.

(10) Patent No.: US 12,439,237 B2
(45) Date of Patent: Oct. 7, 2025

(54) HOME NETWORK ASSISTED CONCURRENT ACCESS TO NETWORK SLICES IN MULTIPLE VISITED PUBLIC LAND MOBILE NETWORKS (VPLMNs)

(71) Applicant: Cisco Technology, Inc., San Jose, CA (US)

(72) Inventors: Vimal Srivastava, Bangalore (IN); Sri Gundavelli, San Jose, CA (US); Ravi Kiran Guntupalli, Cumming, GA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 458 days.

(21) Appl. No.: 17/705,939

(22) Filed: Mar. 28, 2022

(65) Prior Publication Data
US 2023/0308852 A1    Sep. 28, 2023

(51) Int. Cl.
H04W 8/12    (2009.01)
H04W 8/20    (2009.01)
(Continued)

(52) U.S. Cl.
CPC ............. H04W 8/12 (2013.01); H04W 8/20 (2013.01); H04W 60/04 (2013.01); H04W 84/042 (2013.01)

(58) Field of Classification Search
CPC ......... H04W 8/12; H04W 8/20; H04W 60/04; H04W 84/042
See application file for complete search history.

(56) References Cited

U.S. PATENT DOCUMENTS 7,676,823 B2    3/2010 Acharya et al.
10,419,979 B2   9/2019 Youn et al.
(Continued)

FOREIGN PATENT DOCUMENTS

WO    WO-2022056431 A1 *    3/2022
WO    WO-2022126631 A1 *    6/2022
WO    WO-2022169693 A1 *    8/2022

OTHER PUBLICATIONS

GSMA, "5GS Roaming Guidelines," Version 4.0, https://www.gsma.com/newsroom/wp-content/uploads//NG.113-v4.0.pdf, May 2021, 53 pages.

(Continued)

Primary Examiner — Charles N Appiah
Assistant Examiner — Nicole M Louis-Fils
(74) Attorney, Agent, or Firm — Edell, Shapiro & Finnan, LLC

(57) ABSTRACT

Techniques and mechanisms for use in facilitating home network assisted concurrent access to network slices in multiple visited public land mobile networks (VPLMNs) are described. A control plane (CP) function for mobility management may receive, from a UE (e.g., configured without dual connectivity), a message which indicates a registration request for registration using a first network slice and a second network slice. The CP function may manage registration for the UE in response to the registration request. The CP function may receive, from the UE, a message which indicates a request for establishing a protocol data unit (PDU) session using the second network slice which is not supported or available in the first VPLMN. The CP function may forward the request for establishing the PDU session to an application function (AF) for managing establishment of the PDU session for the UE using the second network slice in a second VPLMN.

20 Claims, 12 Drawing Sheets

(51) Int. Cl.
*H04W 60/04* (2009.01)
*H04W 84/04* (2009.01)

(56) References Cited

U.S. PATENT DOCUMENTS

| | | | |
|---|---|---|---|
| 10,820,185 | B2 | 10/2020 | Faccin et al. |
| 10,849,186 | B2 | 11/2020 | Dao et al. |
| 10,932,132 | B1 | 2/2021 | Gundavelli et al. |
| 11,019,668 | B2 | 5/2021 | Talebi Fard et al. |
| 11,153,813 | B2 | 10/2021 | Qiao et al. |
| 11,184,756 | B2 | 11/2021 | Gupta et al. |
| 2019/0124704 | A1* | 4/2019 | Sun .................. H04L 47/24 |
| 2022/0078590 | A1 | 3/2022 | Gundavelli et al. |
| 2022/0272621 | A1* | 8/2022 | Takakura ............ H04W 8/22 |
| 2022/0337408 | A1* | 10/2022 | You ..................... H04L 63/06 |
| 2023/0262640 | A1* | 8/2023 | Chun ................ H04W 60/04 |
| | | | 455/435.1 |
| 2023/0308833 | A1* | 9/2023 | Yang .................. G01S 1/042 |
| 2024/0244515 | A1* | 7/2024 | Han ................... H04W 48/18 |

OTHER PUBLICATIONS

Cisco, "AMF Overview," https://www.cisco.com/c/en/us/td/docs/wireless/ucc/amf/2021-04/config-and-admin/b_ucc-5g-amf-config-and-admin-guide_2021-04/m_amf-overview.pdf, Nov. 2021, 8 pages.

Cisco, "5G SMF Overview," https://www.cisco.com/c/en/us/td/docs/wireless/ucc/smf/b_SMF/b_SMF_chapter_010010.pdf, Jul. 2020, 16 pages.

Agiwal, et al., "A Survey on 4G-5G Dual Connectivity: Road to 5G Implementation," IEEE Access, vol. 9, https://ieeexplore.ieee.org/document/9328255, Jan. 2021, 18 pages.

3GPP, "3rd Generation Partnership Project; Technical Specification Group Services and System Aspects; System architecture for the 5G System (5GS); Stage 2 (Release 17)," 3GPP TS 23.501, V17.3.0, Technical Specification, https://portal.3gpp.org/desktopmodules/Specifications/SpecificationDetails.aspx?specificationId=3144, Dec. 2021, 559 pages.

3GPP, "Group Services and System Aspects; General Packet Radio Service (GPRS) enhancements for Evolved Universal Terrestrial Radio Access Network (E-UTRAN) access (Release 17)," 3GPP TS 23.401, V17.3.0, Technical Specification, https://portal.3gpp.org/desktopmodules/Specifications/Specification Details.aspx?specificationId=849, Dec. 2021, 450 pages.

3GPP, "3rd Generation Partnership Project; Technical Specification Group Services and System Aspects; Security architecture and procedures for 5G system (Release 16)," 3GPP TS 33.501, V16.7.0, Technical Specification, https://portal.3gpp.org/desktopmodules/Specifications/SpecificationDetails.aspx?specificationId=3169, Jun. 2021, 255 pages.

Verizon, "The Security of Verizon's 5G Network—Network Security Planning, Version 1.0," https://www.verizon.com/about/sites/default/files/2020-09/200574_Schulz_07242020.pdf, Aug. 2020, 11 pages.

3GPP, 3rd Generation Partnership Project; Technical Specification Group Services and System Aspects; Procedures for the 5G System (5GS); Stage 2 (Release 17), 3GPP TS 23.502, V17.3.0, Technical Specification, https://portal.3gpp.org/desktopmodules/Specifications/SpecificationDetails.aspx?specificationId=3145, Dec. 2021, 727 pages.

* cited by examiner

HOME NETWORK ASSISTED CONCURRENT ACCESS TO NETWORK SLICES IN MULTIPLE VISITED PUBLIC LAND MOBILE NETWORKS (VPLMNs)

TECHNICAL FIELD

The present disclosure relates generally to telecommunications systems, and more particularly, to techniques and mechanisms for home network assisted concurrent access to network slices in multiple visited public land mobile networks (VPLMNs) for a user equipment (UE).

BACKGROUND

Fifth Generation (5G) network operation is defined in Third Generation Partnership Project (3GPP) standards. In a 5G network, network slicing is employed to allow operators to logically divide the network into multiple distinct slices, each of which has specific network characteristics and capabilities.

Each slice in the 5G network may be identified by an identifier referred to as Single Network Slice Selection Assistance information (S-NSSAI). The S-NSSAI includes a slice/service type (SST) indicator of the slice/service type and a slice differentiator (SD) indicator which helps in differentiating slices of the same slice type. Different slice/service types or SSTs may include enhanced Mobile Broadband (eMBB), Internet of Things (IoT), Vehicle-to-everything (V2X), and Ultra-Reliable Low-Latency Communication (URLLC).

A user equipment (UE) may register to multiple network slices according to the UE's subscription profile and the network slices that are supported and available in a given location. When the UE is away from its Home Public Land Mobile Network (HPLMN), however, access to these services depends on the support that can be provided through one or more Visited Public Land Mobile Networks (VPLMNs) in that region. For example, a UE that is subscribed to two different network slices offered by the HPLMN may or may not be provided with support for these services when roaming on a single VPLMN. On the other hand, each one of multiple VPLMN's in a given region may support one or more of the subscribed network slices in that region.

Extensions have been identified (e.g., extensions to Steering of Roaming or "SOR") for enabling, on a VPLMN basis, UE awareness of subscribed network slices that a VPLMN can support. Thus, if the UE is capable of dual connectivity, and concurrent attachment to multiple AMF anchors is permitted, then the UE may attach to a first VPLMN for access to one or more network slices and attach to a second VPLMN for access to one or more additional network slices, for concurrent access to the different network slices.

Unfortunately, not all UEs are capable of dual connectivity, as they require dual transmit/receive (Tx/Rx) functions. Thus, UEs configured without dual connectivity are not able to concurrently access different network slices made available by different VPLMNs when roaming.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

FIGS. 3A and 3C form a second call flow diagram of a second call flow for facilitating home network assisted concurrent access to network slices in multiple VPLMNs according to some implementations of the present disclosure, where an AF is queried from a first VPLMN for selection of a session management function (SMF) of a network slice in a second VPLMN for establishing a PDU session using the network slice in the second VPLMN;

DESCRIPTION OF EXAMPLE EMBODIMENTS

Figure 1A:
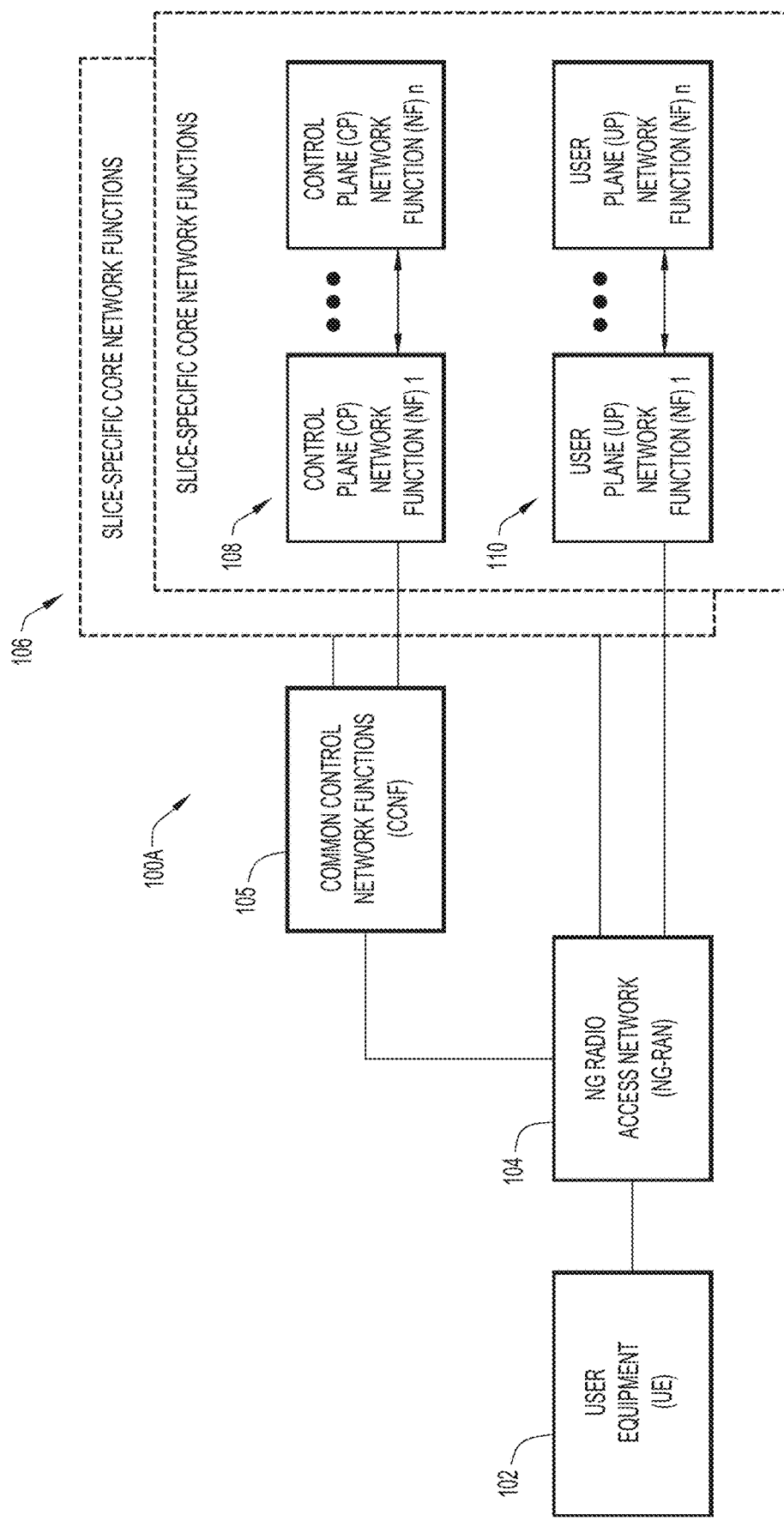
FIG. 1A is an illustrative representation of a basic network architecture of a Fifth Generation (5G) network.

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example implementations described herein.

Overview

Techniques and mechanisms for facilitating home network assisted concurrent access to network slices in multiple visited public land mobile networks (VPLMNs) for a user equipment (UE) are described.

In one illustrative example, a control plane function for mobility management operative for use in a first VPLMN may receive, from a UE (e.g., configured without dual connectivity functionality), a message which indicates a registration request for registration using a first network slice and a second network slice. The control plane function may manage registration for the UE in response to the registration request. The control plane function may further receive, from the UE, a message which indicates a request for establishing a protocol data unit (PDU) session for the UE using the second network slice, which is not supported or available in the first VPLMN. The control plane function may forward the request for establishing the PDU session to an application function (AF) for managing establishment of the PDU session for using the second network slice in a second VPLMN. Alternatively, the control plane function may query the AF for selection of a control plane function for session management of the second network slice of the second VPLMN, and subsequently manage establishment of the PDU session for the UE with the control plane function for session management in the second network slice of the second VPLMN.

More detailed and alternative techniques and implementations are provided herein as described below.

Example Embodiments

What are described herein are techniques and mechanisms for facilitating concurrent access to network slices in multiple visited public land mobile networks (VPLMNs) for a user equipment (UE), especially for UEs configured without dual connectivity functionality.

To better explain with reference to the figures, FIG. 1A is an illustrative representation of a general network architecture 100A of a Fifth Generation (5G) network. Network architecture 100A may include common control network functions (CCNF) 105 and a plurality of slice-specific core network functions 106.

In general, the 5G network is configured to facilitate communications for mobile devices, such as a UE 102. UE 102 may be any suitable type of device, such as a cellular telephone, a smart phone, a tablet device, an Internet of Things (IoT) device, a Machine-to-Machine (M2M) device, and a sensor, to name but a few. UE 102 may obtain access to a 5G Core (5GC) of the 5G network via a radio access network (RAN), which may be or include a Next Generation (NG) RAN (NG-RAN) 104. NG-RAN 104 may include one or more base stations or gNodeBs (gNBs), such as a gNB 107.

Network architecture 100A of the 5G network may be a Service-Based Architecture (SBA) which provides a modular framework from which common applications can be deployed using components of varying sources and suppliers. The SBA of the 5G network may be configured such that control plane functionality and common data repositories are provided by way of a set of interconnected Network Functions (NFs), each with authorization to access each other's services.

Accordingly, CCNF 105 includes a plurality of NFs which commonly support all sessions for UE 102. UE 102 may be connected to and served by a single CCNF 105 at a time, although multiple sessions of UE 102 may be served by different slice-specific core network functions 106. CCNF 105 may include, for example, an Access and Mobility Management Function (AMF) and a Network Slice Selection Function (NSSF). UE-level mobility management, authentication, and network slice instance selection are examples of functionalities provided by CCNF 105.

Slice-specific core network functions 106 of the network slices may be separated into control plane (CP) NFs 108 and user plane (UP) NFs 110. In general, the user plane carries user traffic while the control plane carries network signaling. CP NFs 108 are shown in FIG. 1A as CP NF 1 through CP NF n, and UP NFs 110 are shown in FIG. 1A as UP NF 1 through UP NF n. CP NFs 108 may include, for example, a Session Management Function (SMF), whereas UP NFs 110 may include, for example, a User Plane Function (UPF).

Figure 1B:
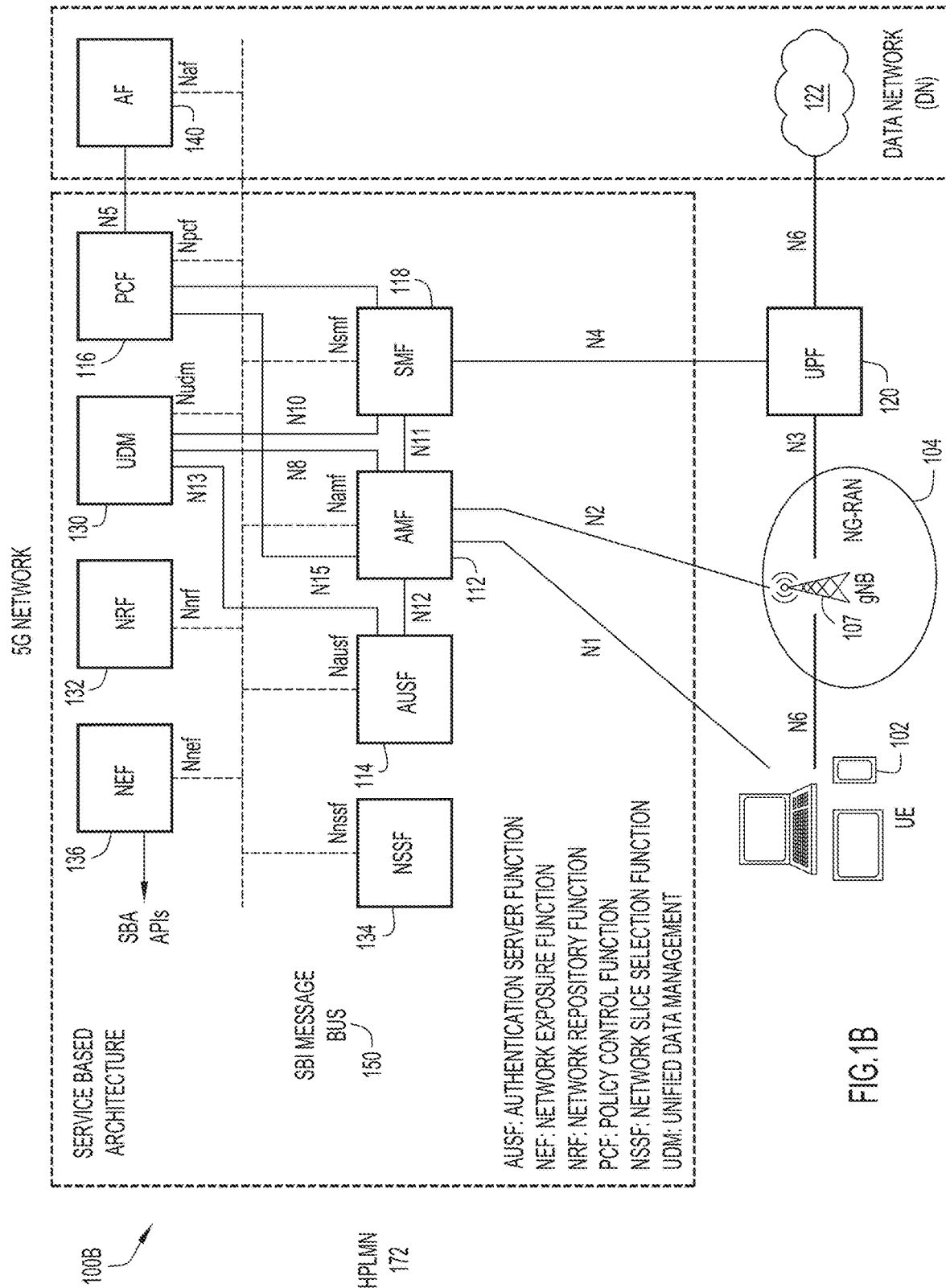
FIG. 1B is an illustrative representation of a more detailed network architecture of the 5G network of FIG. 1A, which may represent a home public land mobile network (HPLMN) of a user equipment (UE)

FIG. 1B is an illustrative representation of a more detailed network architecture 100B of the 5G network of FIG. 1A. In Third Generation Partnership Project (3GPP) standards for 5G (e.g., 3GPP Technical Specifications or "TS" 23.501 and 23.502), network architecture 100B for the 5G network may include an AMF 112, an Authentication Server Function (AUSF) 114, a Policy Control Function (PCF) 116, an SMF 118, and a UPF 120 which may connect to a Data Network (DN) 122. Other NFs in the 5G network include an NSSF 134, a Network Exposure Function (NEF) 136, an NF repository function (NRF) 132, and a Unified Data Management (UDM) 130. The 5G network shown in FIG. 1B may represent a Home Public Land Mobile Network (HPLMN) 172 of UE 102.

In FIG. 1B, UPF 120 is part of the user plane and all other NFs (i.e. AMF 112, AUSF 114, PCF 116, SMF 118, and UDM 130) are part of the control plane. Separation of user and control planes guarantees that each plane resource may be scaled independently. It also allows UPFs to be deployed separately from CP functions in a distributed fashion. The NFs in the CP are modularized functions; for example, AMF 112 and SMF 118 may be independent functions allowing for independent evolution and scaling. A plurality of interfaces and/or reference points N1-N8, N10-N13, and N15 shown in FIG. 1B (as well as others) may define the communications and/or protocols between each of the entities, as described in the relevant (evolving) standards documents.

The SBA of the 5G network is better illustrated in FIG. 1B, whereby the control plane functionality and common data repositories are provided by way of the set of interconnected NFs. Assuming the role of either service consumer or service producer, NFs may be self-contained, independent and reusable. With the SBA, each NF service may expose its functionality through a Service Based Interface (SBI) message bus 150. SBI message bus 150 may employ a Representational State Transfer (REST) interface (e.g., using Hypertext Transfer Protocol Version 2 or "HTTP/2"). As indicated in FIG. 1B, the SBI interfaces of SBI message bus 150 may include an Namf for AMF 112, an Nausf for AUSF 114, an Npcf for PCF 116, an Nsmf for SMF 118, an Nudm for UDM 130, an Nnrf for NRF 132, an Nnssf for NSSF 134, an Nnef for NEF 136, and an Naf for AF 140.

UDM 130 may provide services to SBA functions, such as AMF 112, SMF 118 and NEF 136. UDM 130 is typically recognized as a stateful message store, holding information in its local memory. Alternatively, UDM 130 may be stateless, storing information externally within a Unified Data Repository (UDR). UDM 130 may be considered to be analogous to a Home Subscriber Server (HSS), providing authentication credentials while being employed by AMF 112 and SMF 118 to retrieve subscriber data and context. In communication with UDM 130, AUSF 114 provides for authentication, relying on a backend service for computing authentication data and keying materials.

One or more application functions, such as an Application Function (AF) 140 may connect to the 5G network. In general, an application function such as AF 140 may interact with the network via NEF 136 in order to access network capabilities. NEF 136 may securely expose network capabilities and events provided by NFs to AF 140, and may provide a means for AF 140 to securely provide information to the 5G network. In the present disclosure, AF 140 may be configured to support home network assistance for session establishment to be described later.

An NF instance is an identifiable instance of an NF. In general, NRF 132 may maintain NF profiles of available NF instances and their associated services, and support a service discovery function for service discovery associated with the NF profiles. NF profiles of NF instances maintained in NRF 132 may include NF instance ID, NF type (e.g., AMF, SMF, PCF, UPF, etc.), network slice identifiers such as NSI ID, NF capacity information, names of supported services, etc. For service discovery, NRF 132 may receive a discovery request from an NF instance and provide information associated with the discovered NF instance to the NF instance in response.

In some implementations, the SBA of FIG. 1B may be an enhanced eSBA architecture, introduced in Release 16 of the 3GPP standards, which defines what are referred to as NF Sets and NF Service Sets. More particularly, an NF Set is a group of interchangeable NF instances of the same type, supporting the same services and the same network slice. The NF instances of the same NF Set may be geographically distributed but have access to the same context data. On the other hand, an NF service is a functionality exposed by an NF through the SBI and consumed by other authorized NFs. An NF service instance is an identifiable instance of an NF service, and an NF service operation is an elementary unit of which an NF service is composed. An NF Service Set is a group of interchangeable NF service instances of the same service type within an NF instance. The NF service instances in the same NF Service Set have access to the same context data.

In a 5G network, network slicing is employed to allow operators to logically divide the network into multiple distinct slices, each of which has specific network characteristics and capabilities. Network slicing brings a high degree of deployment flexibility and efficient resource utilization when deploying diverse network services and applications. NSSF 134 may facilitate network slicing in the 5G network, as it operates to select network slice instances (NSIs) for UEs. A logical, end-to-end network slice may have predetermined capabilities, traffic characteristics, and Service Level Agreements (SLAs), and may include the virtualized resources required to service the needs of a Mobile Virtual Network Operator (MVNO) or group of subscribers, including a dedicated UPF 120, SMF 118, and PCF 116.

Each network slice in the 5G network may be identified by an identifier which may be referred to as Single Network Slice Selection Assistance information (S-NSSAI). The S-NSSAI includes a slice/service type (SST) indicator of the slice/service type and a slice differentiator (SD) indicator which helps in differentiating network slices of the same slice type. Different slice/service types or SSTs may include enhanced Mobile Broadband (eMBB), Massive IoT (MIoT), Vehicle-to-everything (V2X), massive Machine-Type Communication (mMTC), and Ultra-Reliable Low-Latency Communication (URLLC).

When UE 102 registers with the 5GC (e.g., its HPLMN 172 of FIG. 1B), it may send to AMF 112 a registration request which includes a Requested NSSAI and receive an Allowed NSSAI in response. The Allowed NSSAI may be selected based on the subscription of UE 102 and other criteria. The other criteria may include, for example, include location, network conditions, access-types, operator policies, etc. On receiving the Allowed NSSAI, UE 102 may establish a Protocol Data Unit (PDU) Session to access the intended services using the requested network slice.

UE 102 may even register to multiple network slices (e.g., slices of different slice/service types associated with different SST indicators) according to the UE's subscription profile and the network slices that are supported and available at a given location of UE 102. When UE 102 is outside of its home network coverage (e.g., HPLMN 172 of FIG. 1B), access to its subscribed services depends on the support that can be provided through one or more VPLMNs in that region.

Recently, extensions have been identified (e.g., extensions to Steering of Roaming or "SOR") for enabling, on a VPLMN basis, UE awareness of subscribed network slices that a VPLMN can support. If UE 102 is subscribed to two different network slices that are supported and available in HPLMN 172, UE 102 may or may not be provided with support for these services on a single VPLMN when roaming. On the other hand, each one of multiple VPLMN's in a given region may support the different slices of UE 102, such that UE 102 can access all of its subscribed services amongst the different VPLMNs. For example, if UE 102 is capable of dual connectivity, and concurrent attachment to multiple AMF anchors is permitted, then UE 102 may attach to a first VPLMN for one or more subscribed network slices and attach to a second VPLMN for one or more additional subscribed network slices (e.g., those that are not supported or available in the first VPLMN).

Unfortunately, not all UEs are capable of dual connectivity, as they are not equipped with dual transmit/receive (Tx/Rx) functionality. As is apparent, UEs configured without dual connectivity functionality are not able to concurrently access multiple network slices amongst different VPLMNs when roaming.

What are needed are techniques and mechanisms for facilitating concurrent access to network slices in multiple VPLMNs, which are especially suitable for UEs configured without dual connectivity functionality.

Figure 2A:
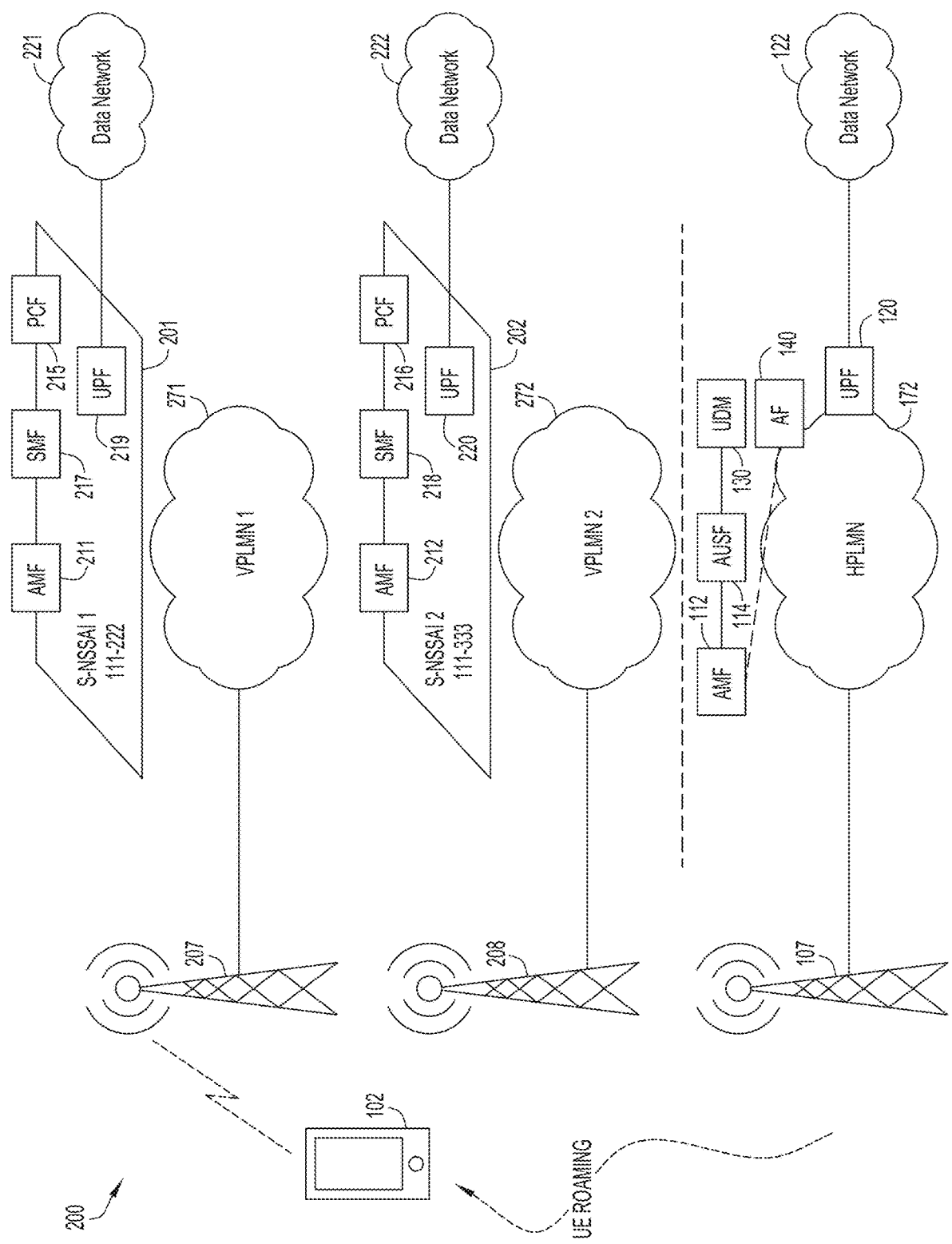
FIG. 2A is an illustrative representation of a communication system including the HPLMN of FIG. 1B, a first visited public land mobile network (VPLMN) that offers service in a first network slice, and a second VPLMN that offers service in a second network slice, where the UE is shown to roam on the first VPLMN from the HPLMN.

With reference again to the figures, FIG. 2A is an illustrative representation of a communication system 200 including HPLMN 172 of UE 102 (e.g., FIG. 1B), a VPLMN 271 ("VPLMN 1") that offers service in a network slice 201, and a VPLMN 272 ("VPLMN 2") that offers service in a network slice 202. In FIG. 2A, network slice 201 of VPLMN 271 is shown to utilize an AMF 211, a PCF 215, an SMF 217, and a UPF 219. On the other hand, network slice 202 of VPLMN 272 is shown to utilize an AMF 212, a PCF 216, an SMF 218, and a UPF 220.

Network slices 201 and 202 in VPLMNs 271 and 272, respectively, may be slices of different slice/service types that are associated with different SST indicators. In the present example, network slice 201 of VPLMN 271 may be associated with S-NSSAI 1 (e.g., or "111-222") and network slice 202 of VPLMN 272 may be associated with S-NSSAI 2 (e.g., or "111-333"). On the other hand, VPLMN 271 does not support or make available S-NSSAI 2 (e.g., or "111-333") (e.g., the slice type associated with 111-333), and VPLMN 272 does not support or make available S-NSSAI 1 (e.g., or "111-222") (e.g., the slice type associated with 111-333).

A subscriber associated with UE 102 may be subscribed to both S-NSSAI 1 (e.g., or "111-222") and S-NSSAI 2 (e.g., or "111-333"), network slices that are indeed supported in HPLMN 172 of UE 102. As illustrated in FIG. 2A, however, UE 102 may roam from HPLMN 172 on to VPLMN 271 which offers service for S-NSSAI 1 (e.g., using network slice 201) but not for S-NSSAI 2. In some implementations, the UE 102 is configured without dual connectivity functionality, and therefore operates to attach (only) to VPLMN 271 via a gNB 207 for using network slice 201. More specifically, UE 102 may operate to attach to VPLMN 271 via gNB 207 for using network slice 201, but not to VPLMN 272 via a gNB 208 for using network slice 202 even though UE 102 is within suitable radio coverage of gNB 208/VPLMN 272 (e.g., due to the lack of dual connectivity functionality of UE 102).

Figure 2B:
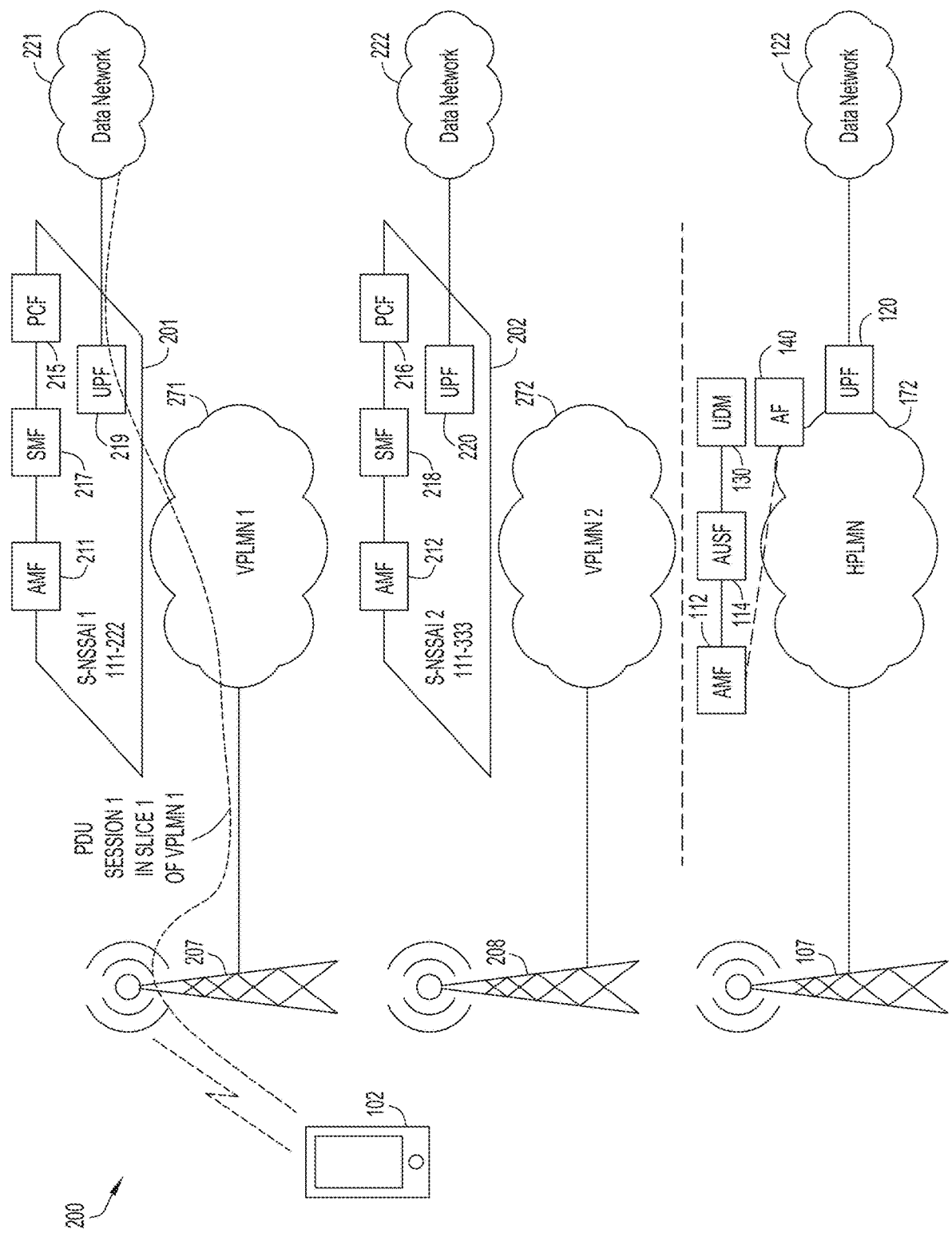
FIG. 2B is an illustrative representation of the communication system of FIG. 2A, where the UE registered in the first VPLMN is shown to maintain a first protocol data unit (PDU) session using the first network slice of the first VPLMN.

After registration in VPLMN 271 according to the present disclosure, UE 102 may send via gNB 207 a message which indicates a request for a PDU session using S-NSSAI 1, which causes the PDU session to be established and maintained using network slice 201 in VPLMN 271. The PDU session of UE 102 using network slice 201 in VPLMN 271 is illustrated in FIG. 2B, indicated as "PDU SESSION 1" (which may be referred to as an initial PDU session). UE 102 may subsequently send via gNB 207 a message which indicates a request for an additional PDU session using S-NSSAI 2, which causes the additional PDU session to be established and maintained using network slice 202 in VPLMN 272. The additional PDU session of UE 102 using network slice 202 in VPLMN 272 is illustrated in FIG. 2C, indicated as "PDU SESSION 2." As is apparent, UE 102 has concurrent access to network slices 201 and 202 in VPLMNs 271 and 272, respectively.

Figure 2C:
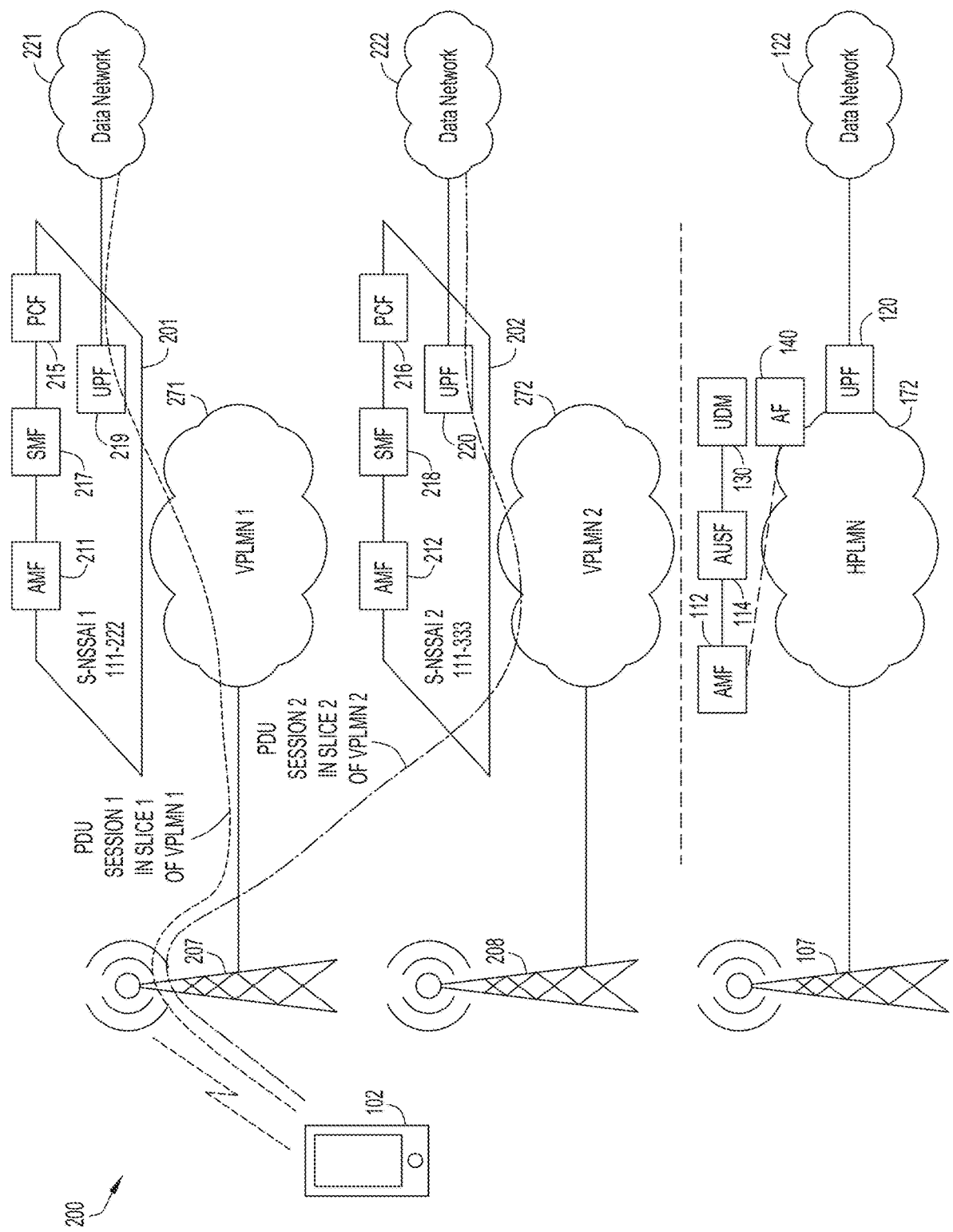
FIG. 2C is an illustrative representation of the communication system of FIG. 2B, where the UE is shown to further maintain a second PDU session using in the second network slice of the second VPLMN.

The above-described concurrent access to services in network slices 201 and 202 illustrated in FIG. 2C may be achieved with use of the techniques and mechanisms of the present disclosure described herein, and may be referred to herein as home network assisted session establishment.

Figure 2D:
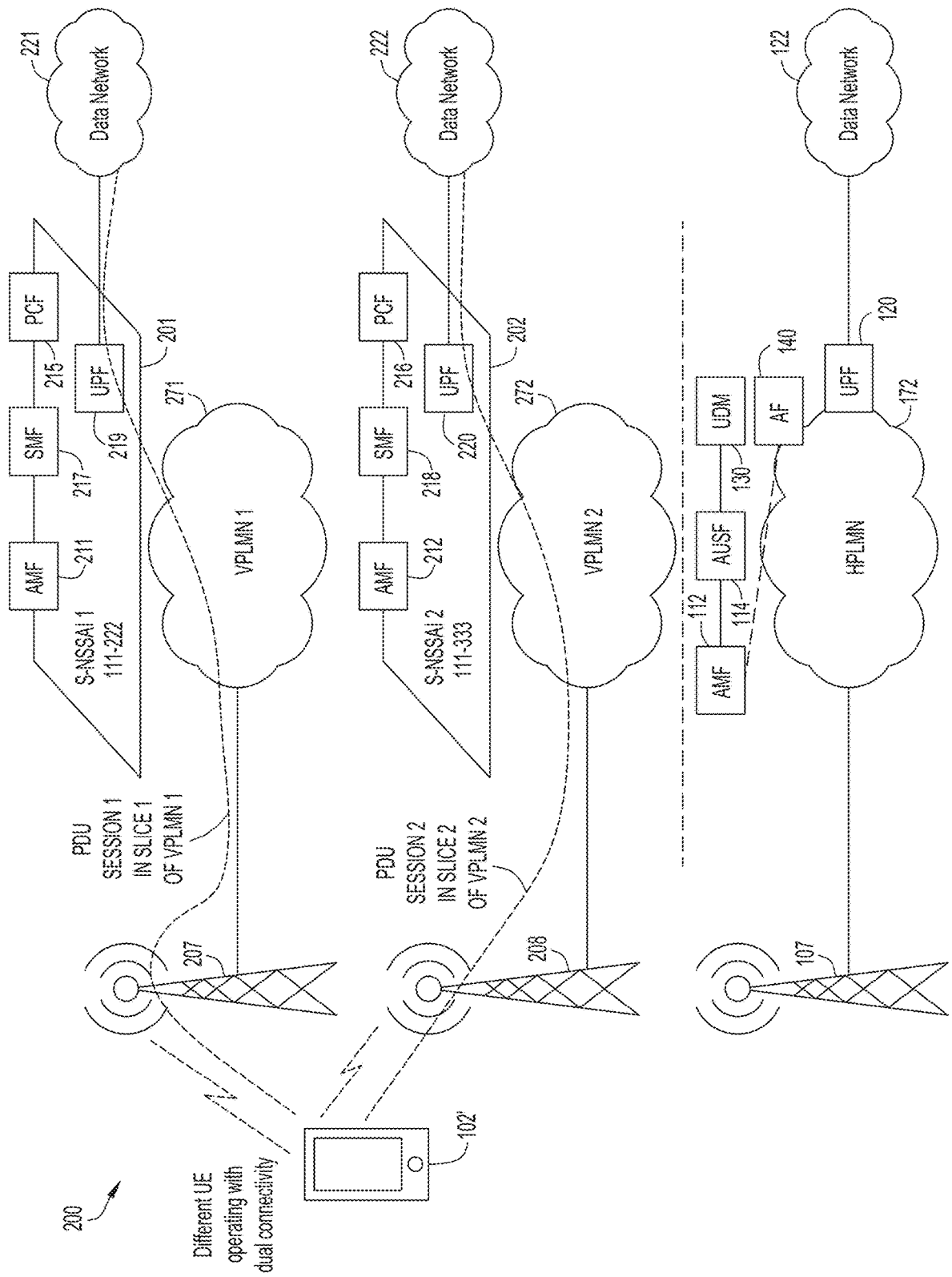
FIG. 2D is an illustrative representation of the communication system of FIGS. 2A-2C, except that a different UE configured with dual connectivity functionality is shown to operate in the first and the second VPLMNs for comparative purposes with the UE in FIG. 2C.

For comparative purposes, FIG. 2D reveals the communication system 200 of FIGS. 2A-2C, except showing a different UE 102' configured to operate with dual connectivity functionality. In FIG. 2D, different UE 102' is shown to maintain a first PDU session ("PDU SESSION 1") using network slice 201 of VPLMN 271 (e.g., via gNB 207 that is utilized by VPLMN 271) and maintain a second PDU session ("PDU SESSION 2") using in network slice 202 of VPLMN 272 (e.g., via gNB 208 that is utilized by VPLMN 272).

Although the techniques and mechanisms of the present disclosure may be especially suitable for use with UEs without dual connectivity functionality (e.g., UE 102 of FIGS. 2A-2C), other UEs (e.g., different UE 102' configured with dual connectivity functionality in FIG. 2D) may utilize the techniques and mechanisms of the present disclosure as an alternative access method (e.g., due to RAN unavailability, power conservation, other determined efficiencies, etc.).

Figure 3A:
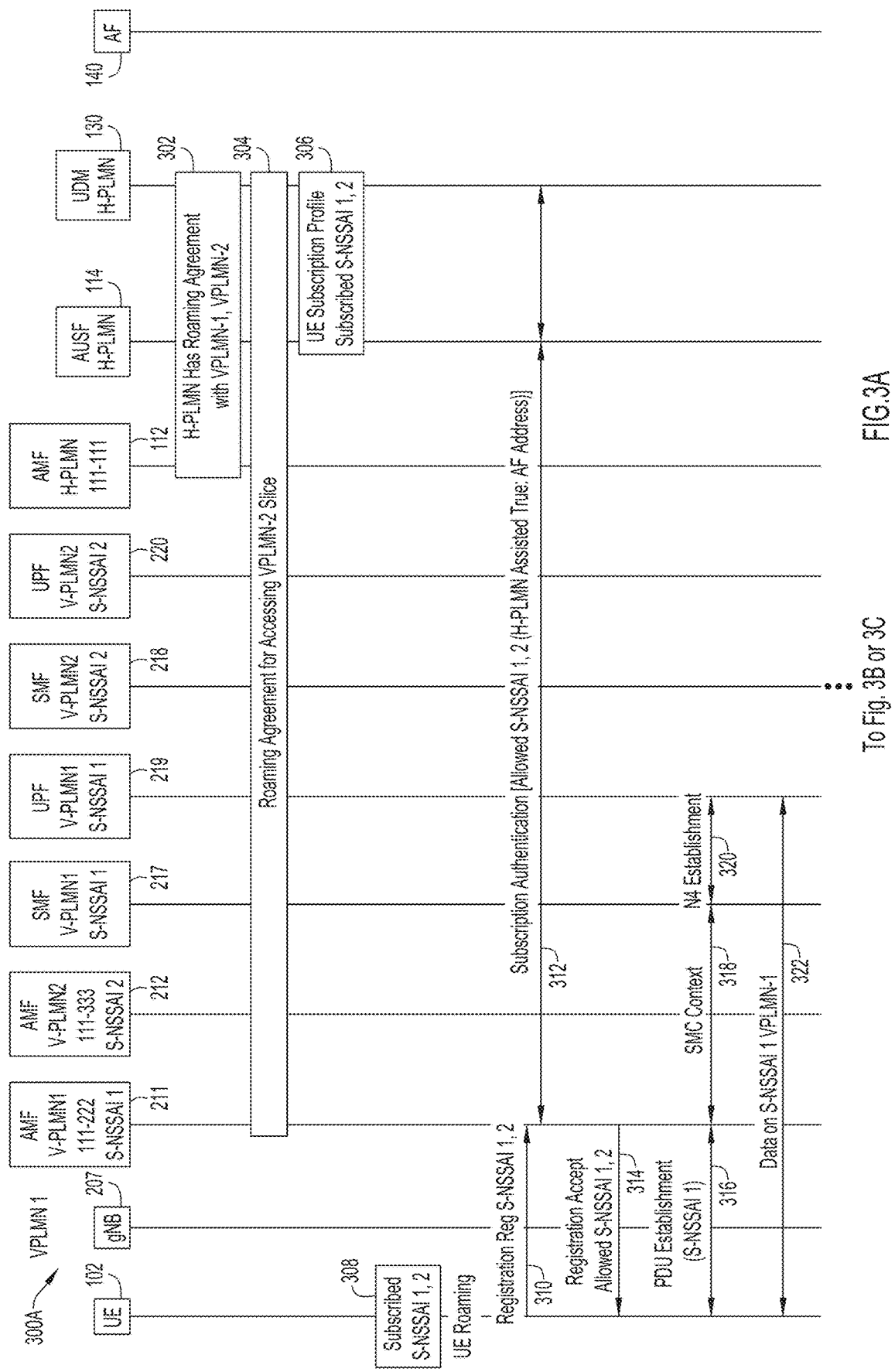
FIGS. 3A and 3B form a first call flow diagram of a first call flow for facilitating home network assisted concurrent access to network slices in multiple VPLMNs according to some implementations of the present disclosure, where a request for a PDU session is received in a first VPLMN and forwarded to an application function (AF) for managing establishment the PDU session using a network slice in a second VPLMN.
Figure 3B:
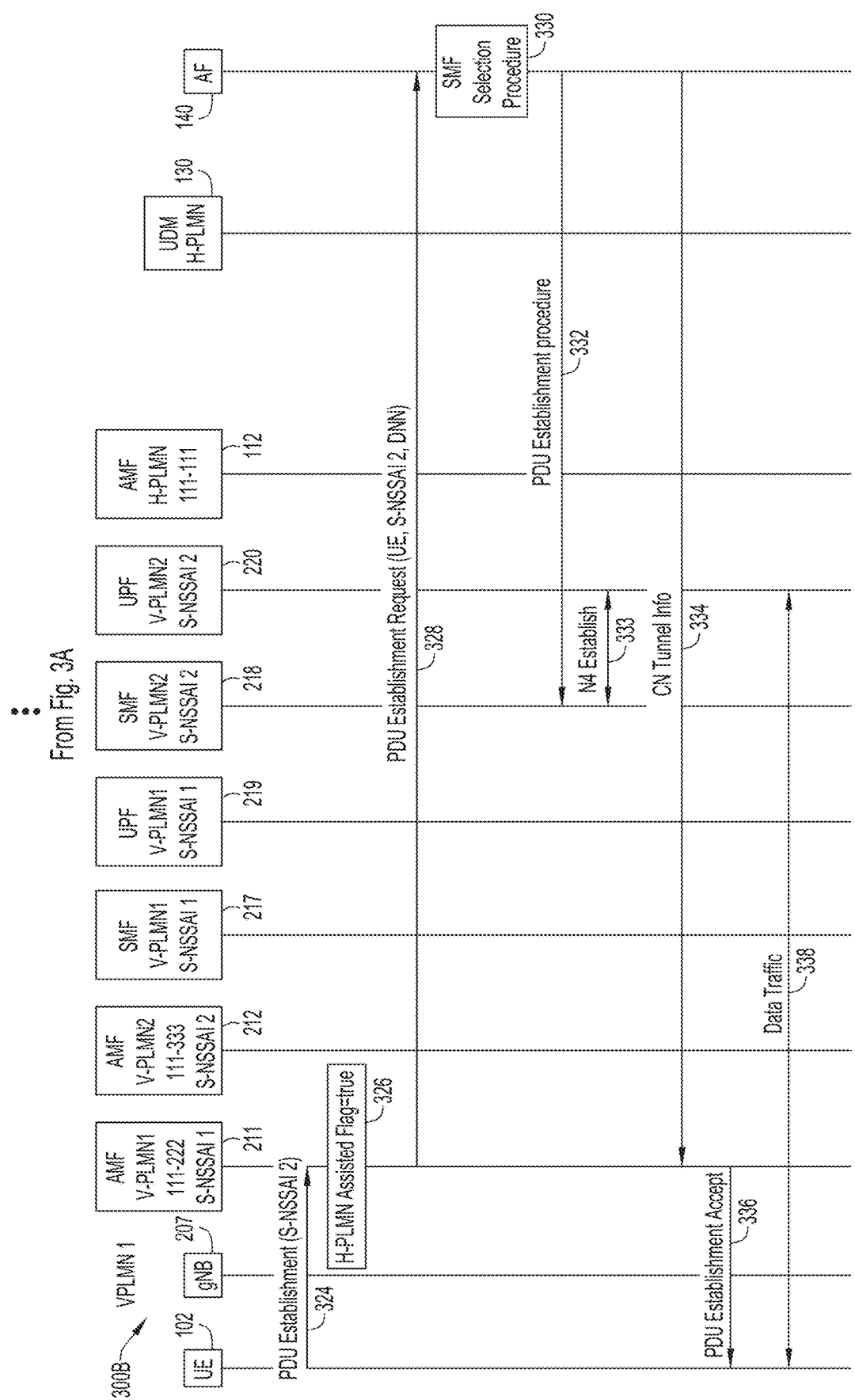

FIGS. 3A and 3B form a first call flow diagram (including diagram portions 300A and 300B, respectively) for describing a first call flow for facilitating home network assisted concurrent access to network slices in multiple VPLMNs according to some implementations of the present disclosure. The techniques and mechanisms described herein may be utilized to achieve concurrent access for UEs as shown and described in relation to FIGS. 2A-2C, where the network(s) provide support for what may be referred to as home network assisted session establishment. In the approach used in the first call flow of FIGS. 3A and 3B, a request for a PDU session is received in a first VPLMN and forwarded to an AF for managing establishment the PDU session using a network slice in a second VPLMN.

The first call flow of FIGS. 3A and 3B is consistent with the description of FIGS. 2A-2C, where UE 102 is associated with a home network corresponding the HPLMN and has a subscription to both S-NSSAI 1 (e.g., or "111-222") and S-NSSAI 2 (e.g., or "111-333") that are supported by the HPLMN. VPLMN 1 offers service in the network slice corresponding to S-NSSAI 1 (e.g., or "111-222") and VPLMN 2 offers service in a network slice corresponding to S-NSSAI 2 (e.g., or "111-333"). In addition, in at least some implementations, VPLMN 1 does not support or make available S-NSSAI 2 (e.g., or "111-333"), and/or VPLMN 2 does not support or make available S-NSSAI 1 (e.g., or "111-222").

In a preliminary step 302 of FIG. 3A (i.e., in diagram portion 300A), the HPLMN may be configured with subscription/roaming permissions for roaming in VPLMN 1 and VPLMN 2 via one or more roaming agreements (e.g., subscription/roaming permissions indicated in UDM 130. In an additional preliminary step 304 of FIG. 3A, VPLMN 1 and VPLMN 2 and/or the HPLMN may be further configured with additional subscription/roaming permissions for the accessing of the network slice in VPLMN 2 via one or more roaming agreements. In further preliminary steps 306 and 308 of FIG. 3A, a subscription profile associated with UE 102 may indicate the UE's subscription to both S-NSSAI 1 (e.g., or "111-222") and S-NSSAI 2 (e.g., or "111-333") that are supported by the HPLMN.

The HPLMN (as well as VPLMN 1 and VPLMN 2) may support home network assistance for session establishment when UE 102 is roaming. More specifically, support may be indicated with use of a subscription parameter which permits home network assistance for UE 102 when it is roaming in a visited network (e.g., a subscription for assisted roaming) (e.g., 0=assisted roaming is not supported, 1=assisted roaming is supported). In some implementations, any suitable data or values associated with UE 102 and/or the network which are stored and/or communicated may be identified to infer an indication of support of the home network assisted roaming. Specifically, network support may be provided with use of AF 140 (or other suitable NF, within or outside of the HPLMN) which is configured to provide the assisted roaming functionality as described herein. Here, an identifier or address of AF 140 may be stored in UDM 130 (e.g., and/or NRF 132, other database, etc.) (e.g., together with the subscription parameter) for subsequent use by the AMF of the VPLMN (e.g., AMF 211 of VPLMN 1) for the home network assisted roaming.

To begin, UE 102 may roam outside of its HPLMN and determine that VPLMN 1 and VPLMN 2 are available for communication (e.g., both offer suitable radio coverage via gNB 207 and gNB 208, respectively). UE 102 may select VPLMN 1 for access via gNB 207. In some implementations, UE 102 may operate to perform network selection as is conventional. In some implementations, UE 102 may select VPLMN 1 based on the use of extensions to SOR that provide UE awareness of subscribed network slices that a VPLMN supports. Through gNB 207, UE 102 may send to AMF 211 of the VPLMN 1 a message which indicates a registration request for registration (step 310 of FIG. 3A). The message which indicates the registration request may include Requested NSSAIs which are, in this example, NSSAI 1 and NSSAI 2.

AMF 211 may receive and process the message for registration, sending to AUSF 114 of the HPLMN a message for subscription authentication of UE 102 (step(s) 312 of FIG. 3A). Here, one or more messages may be communicated with the HPLMN. AUSF 114 may interact with UDM 130 of the HPLMN for appropriate processing. AMF 211 may interact directly with the UDM 130 to obtain a subscription profile for subscription information. Subscription/roaming permissions associated with the subscription and roaming agreements may be processed. Processing may include the comparison and verification of supported NSSAIs, identification of valid subscription/roaming permissions, and/or identification of support for home network assisted roaming.

In the present example, the VPLMN 1 offers service associated S-NSSAI 1 but does not support or make available S-NSSAI 2. However, home network assisted roaming is indicated as being supported (and, e.g., VPLMN 2 provides support for S-NSSAI 2, and has appropriate permissions). More specifically, the subscription profile obtained by AMF 211 includes the subscription parameter which indicates support for home network assisted roaming (e.g., '1'=support for assisted roaming) and the identifier or address of AF 140 which is configured to provide the home network assistance. AMF 211 of VPLMN 1 may create and populate the appropriate contexts associated with UE 102, which includes storing the subscription parameter and the identifier or address of AF 140 in association with S-NSSAI 2. AMF 211 may send to UE 102 a message which indicates a registration accept including Allowed NSSAIs (step 314 of FIG. 3A). In this case, the Allowed NSSAIs include S-NSSAI 1 and S-NSSAI 2.

After authentication and registration, UE 102 may operate to establish a PDU session (e.g., a first PDU session) using S-NSSAI 1 in VPLMN 1. Here, UE 102 may send to AMF 211 of VPLMN 1 a message which may be an uplink (UL) non-access stratum (NAS) transport message, which includes a message indicating a PDU establishment request for PDU session establishment (step(s) 316 of FIG. 3A). This message may include an S-NSSAI which, in this case, includes S-NSSAI 1. AMF 211 may receive and process the message, sending to SMF 217 a message for PDU session creation, which includes the communication of a 5G security context to SMF 217 (step 318 of FIG. 3A). SMF 217 may create an N4 session with UPF 219 in an N4 establishment procedure (step 320 of FIG. 3A). AMF 211 may send to UE 102 a message which indicates a PDU establishment accept. Thus, a PDU session (e.g., the first PDU session) is established such that UE 102 may utilize services in S-NSSAI 1 of VPLMN 1 involving data traffic communication (step 322 of FIG. 3A) (e.g., with data network 221 of FIG. 2C). The first PDU session may alternatively be referred to as an initial PDU session.

Continuing with the call flow in diagram portion 300B of FIG. 3B, UE 102 may then attempt to establish a PDU session (e.g., a second PDU session) using S-NSSAI 2 in VPLMN 1. Here, UE 102 may send to AMF 211 of VPLMN 1 a message which may be UL NAS transport message, which includes a message indicating a PDU establishment request for PDU session establishment (step 324 of FIG. 3B). This message may include an S-NSSAI which, in this case, includes S-NSSAI 2. AMF 211 may receive and process the message. Again, VPLMN 1 offers service associated S-NSSAI 1 but does not support or make available S-NSSAI 2. However, AMF 211 may check the subscription parameter for identifying whether home network assisted roaming is supported for S-NSSAI 2 (step 326 of FIG. 3B). If so, AMF 211 may also retrieve the identifier or address of AF 140 associated with the home network assistance. Here, the subscription parameter indicates that home network assisted roaming is supported for S-NSSAI 2.

In response, AMF 211 may forward to AF 140 the message which indicates PDU establishment request for (step 328 of FIG. 3B). AF 140 may receive and process this message, which includes performing an SMF selection procedure for selecting an SMF from a plurality of SMFs in S-NSSAI 2 of VPLMN 2 (step 330 of FIG. 3B). In the present example, the SMF selection procedure of AF 140 may result in the identification an identifier or address of SMF 218 in S-NSSAI 2 of the VPLMN 2. AF 140 may use the identifier or address of SMF 218 to perform one or more processing steps of a PDU session establishment procedure (step 332 of FIG. 3B), triggering an N4 session establishment between SMF 218 and UPF 220 (step 333 of FIG. 3B), the communication of CN tunnel information to AMF 211 (step 334 of FIG. 3B), and the setup of QoS Flow(s) of the PDU session using S-NSSAI 2 for UE 102. AMF 211 may send to UE 102 a message which indicates a PDU establishment accept (step 336 of FIG. 3B). Thus, a PDU session (e.g., the second PDU session) is established such that UE 102 utilizes services in S-NSSAI 2 of VPLMN 2 involving data traffic communication (step 338 of FIG. 3B) (e.g., with data network 222 of FIG. 2C).

Figure 3C:
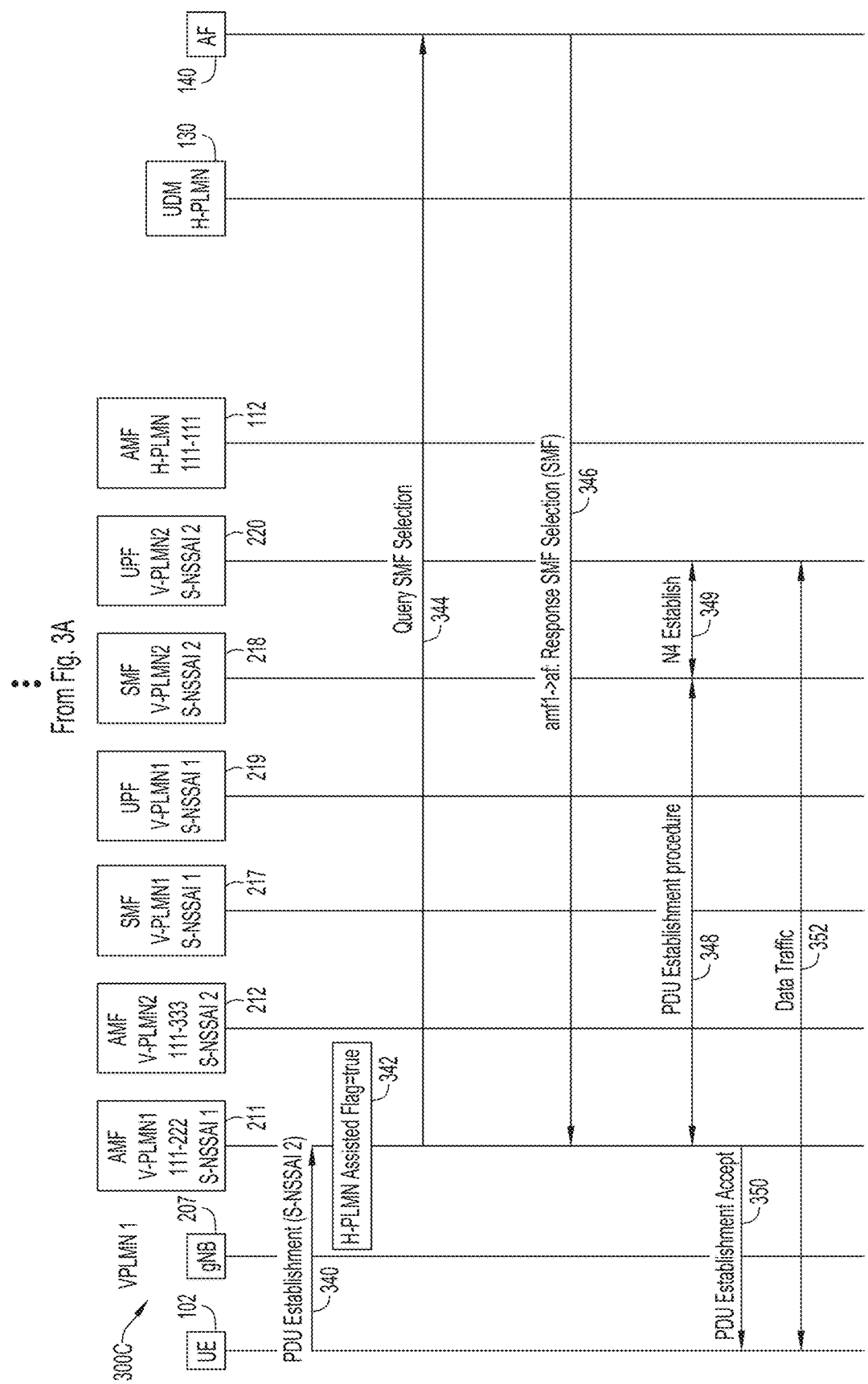

FIGS. 3A and 3C form a second call flow diagram (including diagram portions 300A and 300C, respectively) for describing a second call flow for facilitating home network assisted concurrent access to network slices in multiple VPLMNs according to some implementations of the present disclosure. The techniques and mechanisms described herein may be utilized to achieve concurrent access for UEs as shown and described in relation to FIGS. 2A-2C, where the network(s) provide support for what may be referred to as home network assisted session establishment. In the approach used in the second call flow of FIGS. 3A and 3C, an AF is queried from a first VPLMN for selection of an SMF of a network slice in a second VPLMN for establishing a PDU session using the network slice in the second VPLMN.

The second call flow of FIGS. 3A and 3C is consistent with the description of FIGS. 2A-2C, and the initial configuration, setup, and messaging/processing steps in FIG. 3A may be the same or similar to that already described above, where a PDU session (e.g., the first or initial PDU session) is established such that UE 102 utilizes services in S-NSSAI 1 of VPLMN 1 (e.g., with data network 221 of FIG. 2C).

Continuing then with the second call flow in diagram portion 300C of FIG. 3C, UE 102 may subsequently attempt to establish a PDU session (e.g., a second PDU session) using S-NSSAI 2 in VPLMN 1. Here, UE 102 may send to AMF 211 of VPLMN 1 a message which may be UL NAS transport message, which includes a message indicating a PDU establishment request for PDU session establishment (step 340 of FIG. 3C). This message may include an S-NSSAI which, in this case, includes S-NSSAI 2. AMF 211 may receive and process the message. Again, VPLMN 1 offers service associated S-NSSAI 1 but does not support or make available S-NSSAI 2. However, AMF 211 may check the subscription parameter for identifying whether home network assisted roaming is supported for S-NSSAI 2 (step 342 of FIG. 3C). If so, AMF 211 may also retrieve the identifier or address of AF 140 associated with the home network assistance. Here, the subscription parameter indicates that home network assisted roaming is supported for S-NSSAI 2.

In response, AMF 211 may query the AF 140 for selection of an SMF in S-NSSAI 2 of VPLMN 2 (step 344 of FIG. 3C). AF 140 may receive and process this query, which includes performing an SMF selection procedure for selecting an SMF from a plurality of SMFs in S-NSSAI 2 of VPLMN 2. In the present example, the SMF selection may result in the identification an identifier or address of SMF 218 in S-NSSAI 2 of the VPLMN 2, which is returned to AMF 211 in a query response (step 346 of FIG. 3C). AMF 211 may manage establishment of the PDU session, using the identifier or address of SMF 218 to perform one or more processing steps of a PDU session establishment procedure (step 348 of FIG. 3C), triggering an N4 session establishment between SMF 218 and UPF 220 (step 349 of FIG. 3C). AMF 211 may send to UE 102 a message which indicates a PDU establishment accept (step 350 of FIG. 3C). Thus, a PDU session (e.g., the second PDU session) is established such that UE 102 utilizes services in S-NSSAI 2 of VPLMN 2 for data traffic communication (step 352 of FIG. 3C) (e.g., with data network 222 of FIG. 2C).

Figure 4:
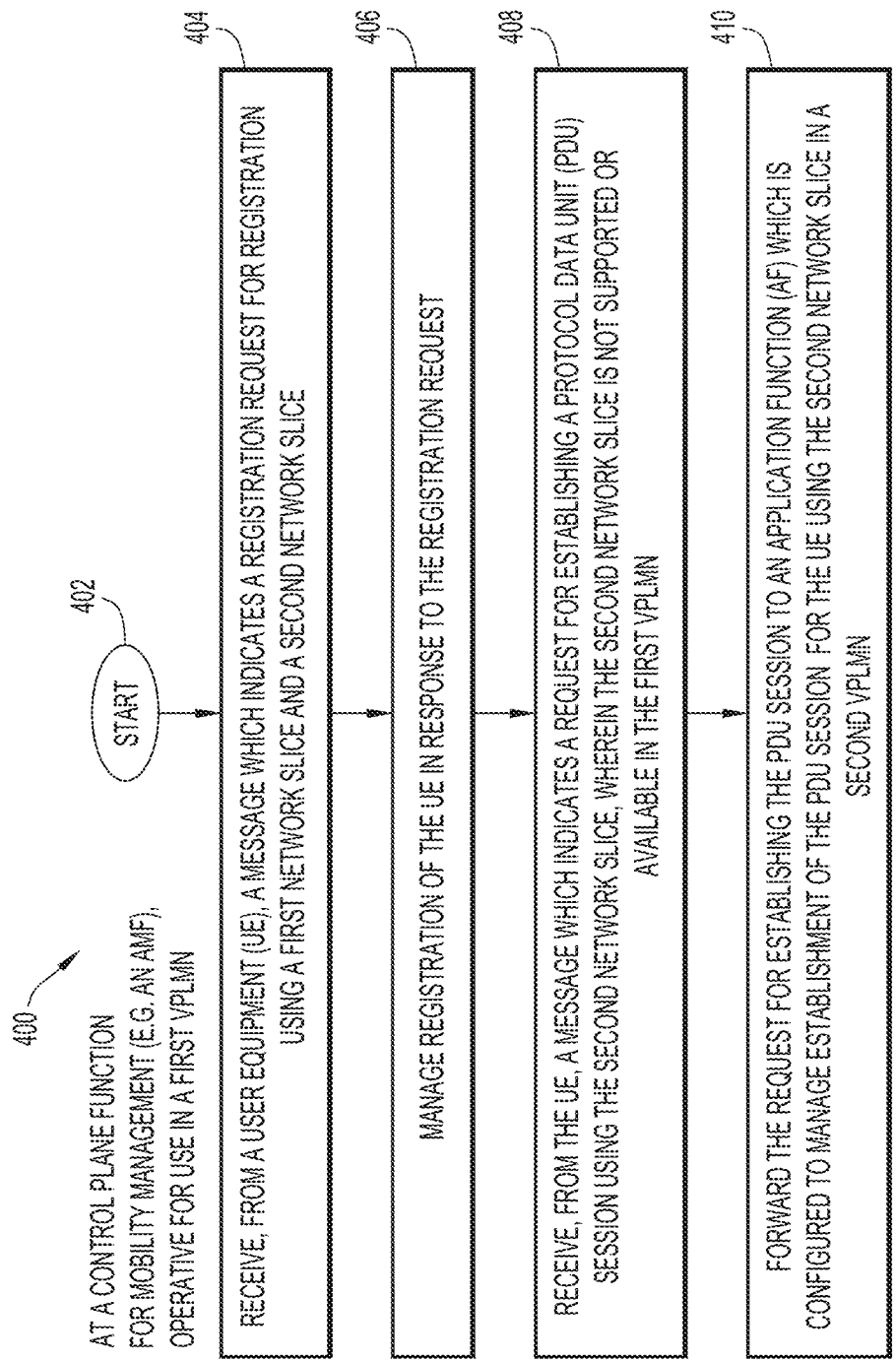
FIG. 4 is a flowchart for describing a method for use in facilitating home network assisted concurrent access to network slices in multiple VPLMNs according to some implementations of the present disclosure, where a request for a PDU session is received in a first VPLMN and forwarded to an AF for managing establishment of the PDU session using a network slice in a second VPLMN, consistent with operation in the first call flow diagram that is formed by FIGS. 3A and 3B.

FIG. 4 is a flowchart 400 for describing a method for use in facilitating home network assisted concurrent access to network slices in multiple VPLMNs according to some implementations of the present disclosure. The approach used in the method of FIG. 4 may be consistent with the first call flow diagram that is formed by FIGS. 3A and 3B earlier described above, where a request for a PDU session is received in a first VPLMN and forwarded to an AF for managing establishment of the PDU session using a network slice in a second VPLMN. The method may be performed by a control plane function, such as a control plane function for mobility management (e.g., an AMF). The method may be embodied in a computer program product which includes a non-transitory computer readable medium and instructions stored in the non-transitory computer readable medium, where the instructions are executable by one or more processors of a network node having the control plane function (e.g., a control plane function node for mobility management, such as an AMF node).

Specifically, the method in the flowchart 400 of FIG. 4 may be for use in facilitating concurrent access for a UE to services in a first VPLMN that supports a first network slice and a second VPLMN that supports a second network slice, where the second network slice is not supported or made available in the first VPLMN. Initially, the UE roams outside of its home network and selects the first VPLMN for access. Beginning at a start block 402 of FIG. 4, the control plane function for mobility management which is operative in the first VPLMN may receive, from the UE, a message which indicates a registration request for registration using the first network slice and the second network slice (step 404 of FIG. 4). The control plane function for mobility management may manage registration of the UE in response to the registration request (step 406 of FIG. 4). The control plane function for mobility management may receive, from the UE, a message which indicates a request for establishing a PDU session for the UE using the second network slice (step 408 of FIG. 4), although the second network slice is not supported or available in the first VPLMN. The control plane function for mobility management may forward the request for establishing the PDU session to an AF which is configured to manage establishment of the PDU session for the UE using the second network slice in the second VPLMN (step 410 of FIG. 4). In managing the establishment of the PDU session, the AF is configured to perform selection of a control plane function for session management (e.g. an SMF) in the second network slice of the second VPLMN. In response, the AF may manage the establishment of the PDU session using the second network slice in the second VPLMN (e.g., with the SMF).

In some implementations, prior to receiving the request for establishing the PDU session for the UE using the second network slice, the control plane function for mobility management may receive, from the UE, a message which indicates a request for establishing an initial PDU session for the UE using the first network slice. In response, the control plane function for mobility management may manage establishment of the initial PDU session using the first network slice in the first VPLMN. Here, the initial PDU session and the PDU session of the UE may be maintained through the same gNB utilized for communications in the first VPLMN, where the UE may be configured without dual connectivity functionality.

In some implementations, upon receipt of the message which indicates the registration request, the control plane function for mobility management may communicate, with an HPLMN, one or more messages in a subscription authentication for the UE. In the subscription authentication, the control plane function for mobility management may obtain a subscription parameter which indicates support for home network assisted roaming. Here, the control plane function for mobility management may forward the request for establishing the PDU session to the AF based on the subscription parameter (e.g., 0=assisted roaming is not supported, 1=assisted roaming is supported). In some further implementations, the control plane function for mobility management may store the subscription parameter in memory and check the subscription parameter upon receiving the message which indicates the request for establishing the PDU session using the second network slice. Here, the control plane function for mobility management may forward the request for establishing the PDU session to the AF based on checking the subscription parameter.

In some implementations, in the subscription authentication, the control plane function for mobility management may obtain an address of the AF which is configured with support for home network assistance for session establishment. Here, the control plane function for mobility management may forward the request for establishing the PDU session to the AF using the address of the AF. In some implementations, in the subscription authentication, the control plane function for mobility management may obtain an acceptance of the first network slice and the second network slice as allowed network slices. The control plane function for mobility management may send, to the UE, a message which indicates a registration accept of the first network slice and the second network slice as allowed network slices.

Figure 5:
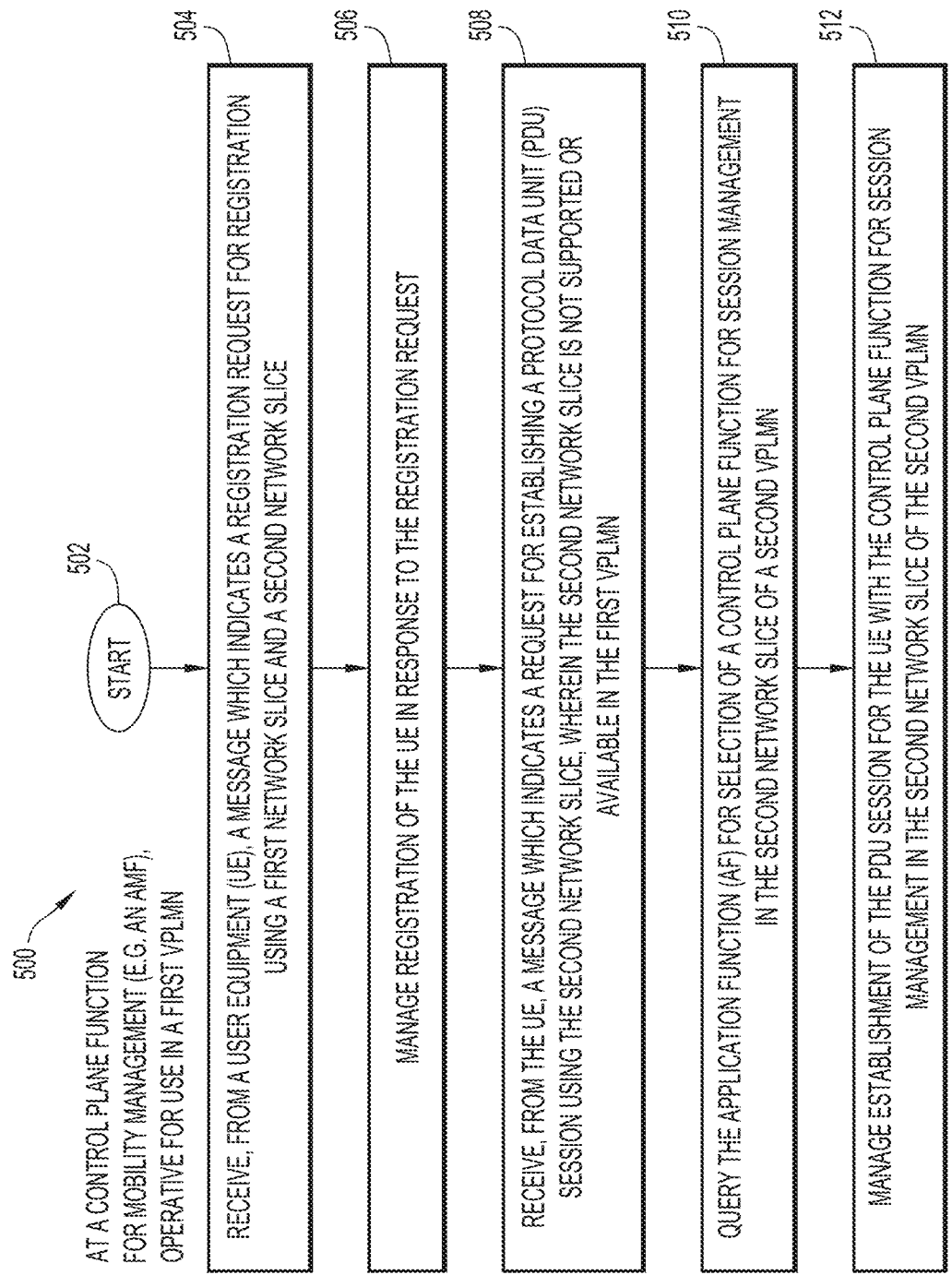
FIG. 5 is a flowchart for describing a method for use in facilitating home network assisted concurrent access to network slices in multiple VPLMNs according to some implementations of the present disclosure, where an AF is queried from a first VPLMN for selection of an SMF of a network slice in a second VPLMN for establishing a PDU session using the network slice in the second VPLMN, consistent with operation in the second call flow diagram that is form FIGS. 3A and 3C.

FIG. 5 is a flowchart 500 for describing a method for use in facilitating home network assisted concurrent access to network slices in multiple VPLMNs according to some implementations of the present disclosure. The approach used in the method of FIG. 5 may be consistent with the second call flow diagram that is formed by FIGS. 3A and 3C described above, where an AF is queried from a first VPLMN for selection of an SMF of a network slice in a second VPLMN for establishing a PDU session using the network slice in the second VPLMN. The method may be performed by a control plane function, such as a control plane function for mobility management (e.g., an AMF). The method may be embodied in a computer program product which includes a non-transitory computer readable medium and instructions stored in the non-transitory computer readable medium, where the instructions are executable by one or more processors of a network node having the control plane function (e.g., a control plane function node for mobility management, such as an AMF node).

Specifically, the method in the flowchart 500 of FIG. 5 may be for use in facilitating concurrent access for a UE to services in a first VPLMN that supports a first network slice and a second VPLMN that supports a second network slice, where the second network slice is not supported or made available in the first VPLMN. Initially, the UE roams outside of its home network and selects the first VPLMN for access. Beginning at a start block 502 of FIG. 5, the control plane function for mobility management which is operative in the first VPLMN may receive, from the UE, a message which indicates a registration request for registration using the first network slice and the second network slice (step 504 of FIG. 5). The control plane function for mobility management may manage registration of the UE in response to the registration request (step 506 of FIG. 5). The control plane function for mobility management may receive, from the UE, a message which indicates a request for establishing a PDU session for the UE using the second network slice (step 508 of FIG. 5), although the second network slice is not supported or available in the first VPLMN. The control plane function for mobility management may query an AF for selection of a control plane function for session management in the second network slice of a second VPLMN (step 510 of FIG. 5). After receiving the identity of the control plane function for session management (e.g., an identity and/or address of an SMF), the control plane function for mobility management may manage establishment of the PDU session with the control plane function for session management in the second network slice of the second VPLMN (step 512 of FIG. 5).

In some implementations, prior to receiving the request for establishing the PDU session for the UE using the second network slice, the control plane function for mobility management may receive, from the UE, a message which indicates a request for establishing an initial PDU session for the UE using the first network slice. In response, the control plane function for mobility management may manage establishment of the initial PDU session using the first network slice in the first VPLMN. Here, the initial PDU session and the PDU session of the UE may be maintained through the same gNB utilized for communications in the first VPLMN, where the UE may be configured without dual connectivity functionality.

In some implementations, upon receipt of the message which indicates the registration request, the control plane function for mobility management may communicate, with an HPLMN, one or more messages in a subscription authentication for the UE. In the subscription authentication, the control plane function for mobility management may obtain a subscription parameter which indicates support for home network assisted roaming. Here, the control plane function for mobility management may query the AF for selection of the control plane function for session management based on the subscription parameter (e.g., 0=assisted roaming is not supported, 1=assisted roaming is supported). In some further implementations, the control plane function for mobility management may store the subscription parameter in memory and check the subscription parameter upon receiving the message which indicates the request for establishing the PDU session using the second network slice. Here, the control plane function for mobility management may query the AF for selection of the control plane function for session management based on checking the subscription parameter.

In some implementations, in the subscription authentication, the control plane function for mobility management may obtain an address of the AF which is configured with support for home network assistance for session establishment. Here, the control plane function for mobility management may query the AF for selection of the control plane function for session management using the address of the AF. In some implementations, in the subscription authentication, the control plane function for mobility management may obtain an acceptance of the first network slice and the second network slice as allowed network slices. The control plane function for mobility management may send, to the UE, a message which indicates a registration accept of the first network slice and the second network slice as allowed network slices.

Figure 6:
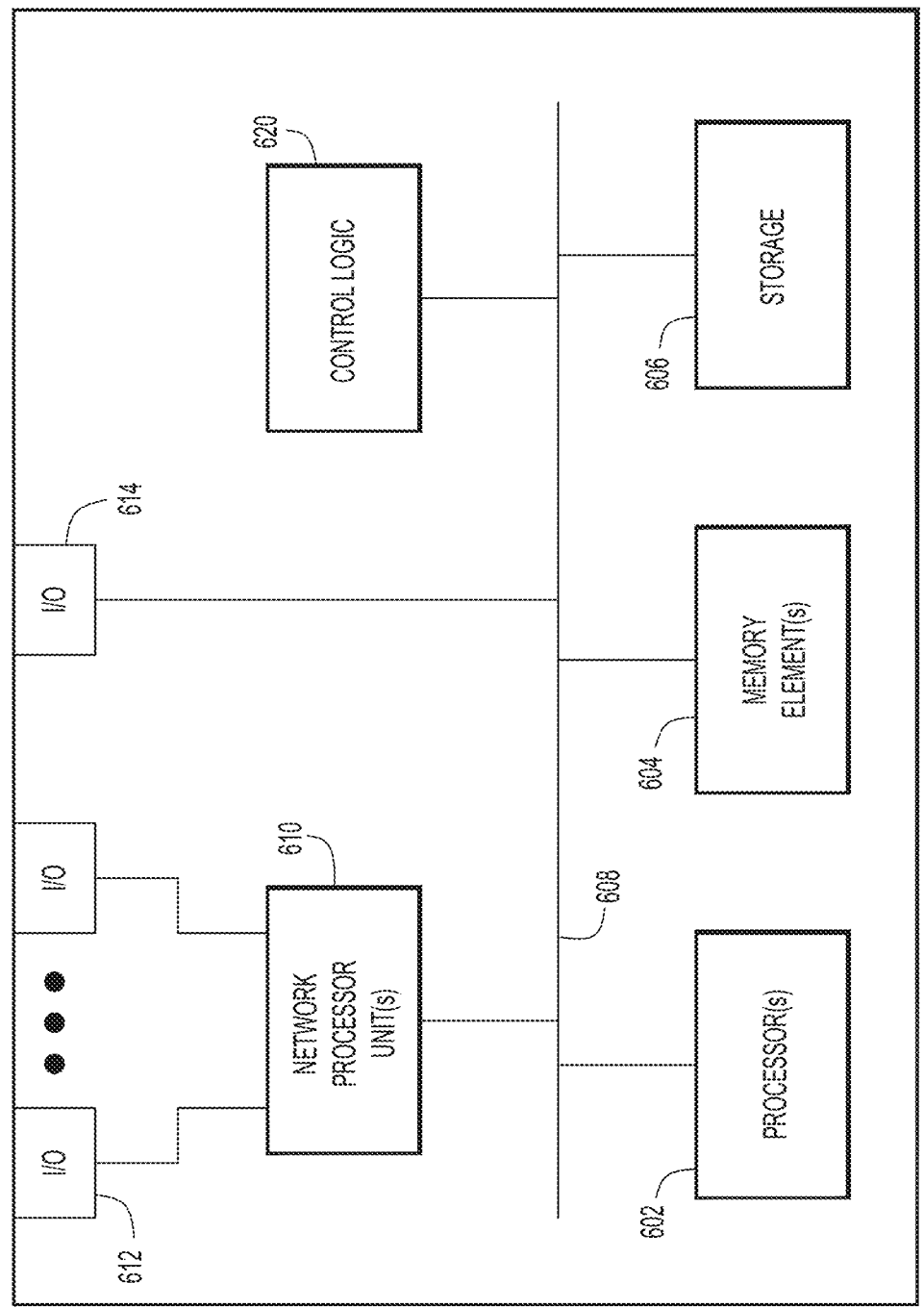
FIG. 6 illustrates a hardware block diagram of a computing device that may perform functions associated with operations of a control plane function (e.g., a control plane function for mobility management) according to some implementations of the present disclosure.

FIG. 6 illustrates a hardware block diagram of a computing device 600 that may perform functions associated with operations discussed herein in connection with the techniques described in relation to the above figures. In various embodiments, a computing device, such as computing device 600 or any combination of computing devices 600, may be configured as any entity/entities as discussed for the techniques depicted in connection with the figures in order to perform operations of the various techniques discussed herein. In particular, computing device 600 may perform operations of a control plane function for mobility management (e.g., an AMF, etc.) for operation in accordance with the method of FIGS. 4 and/or 5, and/or may perform operations according to the first and/or the second call flows of FIGS. 3A/3B and/or 3A/3C (e.g., in an environment such as that described in relation to FIGS. 2A-2C).

In at least one embodiment, computing device 600 may include one or more processor(s) 602, one or more memory element(s) 604, storage 606, a bus 608, one or more network processor unit(s) 610 interconnected with one or more network input/output (I/O) interface(s) 612, one or more I/O interface(s) 614, and control logic 620. In various embodiments, instructions associated with logic for computing device 600 can overlap in any manner and are not limited to the specific allocation of instructions and/or operations described herein.

In at least one embodiment, processor(s) 602 is/are at least one hardware processor configured to execute various tasks, operations and/or functions for computing device 600 as described herein according to software and/or instructions configured for computing device 600. Processor(s) 602 (e.g., a hardware processor) can execute any type of instructions associated with data to achieve the operations detailed herein. In one example, processor(s) 602 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 604 and/or storage 606 is/are configured to store data, information, software, and/or instructions associated with computing device 600, and/or logic configured for memory element(s) 604 and/or storage 606. For example, any logic described herein (e.g., control logic 620) can, in various embodiments, be stored for computing device 600 using any combination of memory element(s) 604 and/or storage 606. Note that in some embodiments, storage 606 can be consolidated with memory element(s) 604 (or vice versa), or can overlap/exist in any other suitable manner.

In at least one embodiment, bus 608 can be configured as an interface that enables one or more elements of computing device 600 to communicate in order to exchange information and/or data. Bus 608 can be implemented with any architecture designed for passing control, data and/or information between processors, memory elements/storage, peripheral devices, and/or any other hardware and/or software components that may be configured for computing device 600. In at least one embodiment, bus 608 may be implemented as a fast kernel-hosted interconnect, potentially using shared memory between processes (e.g., logic), which can enable efficient communication paths between the processes.

In various embodiments, network processor unit(s) 610 may enable communication between computing device 600 and other systems, entities, etc., via network I/O interface(s) 612 to facilitate operations discussed for various embodiments described herein. In various embodiments, network processor unit(s) 610 can be configured as a combination of hardware and/or software, such as one or more Ethernet driver(s) and/or controller(s) or interface cards, Fibre Channel (e.g., optical) driver(s) and/or controller(s), and/or other similar network interface driver(s) and/or controller(s) now known or hereafter developed to enable communications between computing device 600 and other systems, entities, etc. to facilitate operations for various embodiments described herein. In various embodiments, network I/O interface(s) 612 can be configured as one or more Ethernet port(s), Fibre Channel ports, and/or any other I/O port(s) now known or hereafter developed. Thus, the network processor unit(s) 610 and/or network I/O interface(s) 612 may include suitable interfaces for receiving, transmitting, and/or otherwise communicating data and/or information in a network environment.

I/O interface(s) 614 allow for input and output of data and/or information with other entities that may be connected to computing device 600. For example, I/O interface(s) 614 may provide a connection to external devices such as a keyboard, keypad, a touch screen, and/or any other suitable input and/or output device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

In various embodiments, control logic 620 can include instructions that, when executed, cause processor(s) 602 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., control logic 620) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, entities as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, memory element(s) 604 and/or storage 606 can store data, software, code, instructions (e.g., processor instructions), logic, parameters, combinations thereof, and/or the like used for operations described herein. This includes memory element(s) 604 and/or storage 606 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

Thus, techniques and mechanisms for facilitating home network assisted concurrent access to network slices in multiple VPLMNs for a UE have been described.

In one illustrative example of the present disclosure, a method for use in facilitating concurrent access to services in a first VPLMN and a second VPLMN for a UE may be performed at a control plane function for mobility management (e.g., an AMF) operative for use in the first VPLMN. The method may include receiving, from the UE, a message which indicates a registration request for registration using a first network slice and a second network slice; managing registration of the UE in response to the registration request; receiving, from the UE, a message which indicates a request for establishing a PDU session for the UE using the second network slice, wherein the second network slice is not supported or available in the first VPLMN; and forwarding the request for establishing the PDU session to an AF which is configured to manage establishment of the PDU session for the UE using the second network slice in the second VPLMN. Prior to establishing the PDU session, the method may involve receiving, from the UE, a message which indicates a request for establishing an initial PDU session for the UE using the first network slice and, in response, managing establishment of the initial PDU session using the first network slice in the first VPLMN.

In some implementations, the method may further include communicating, with a HPLMN, one or more messages in a subscription authentication for the UE; and obtaining a subscription parameter which indicates support for home network assisted roaming, wherein forwarding the request for establishing the PDU session to the AF is based on the subscription parameter. In some implementations, the method may further include storing the subscription parameter in memory; and checking the subscription parameter upon receiving the message which indicates the request for establishing the second PDU session for the UE using the second network slice which is not supported or available in the first VPLMN, wherein forwarding the request for establishing the PDU session to the AF based on checking the subscription parameter.

In some implementations, the method may further include communicating, with an HPLMN, one or more messages in a subscription authentication for the UE; and obtaining an address of the AF which is configured with support for home network assistance for session establishment, wherein forwarding the request for establishing the PDU session uses the address of the AF. In some implementations, the method may further include communicating, with an HPLMN, one or more messages in a subscription authentication for the UE; and in the subscription authentication, obtaining an acceptance of the first network slice and the second network slice as allowed network slices. In some implementations, the method may further include sending, to the UE, a message which indicates a registration accept of the first network slice and the second network slice as allowed network slices.

In another illustrative example of the present disclosure, a method for use in facilitating concurrent access to services in a first VPLMN and a second VPLMN for a UE may be performed at a control plane function for mobility management (e.g., an AMF) operative for use in the first VPLMN. The method may include receiving, from the UE, a message which indicates a registration request for registration using a first network slice and a second network slice; managing registration of the UE in response to the registration request; receiving, from the UE, a message which indicates a request for establishing a PDU session for the UE using the second network slice, wherein the second network slice is not supported or available in the first VPLMN; querying an AF for selection of a control plane function for session management in the second network slice of a second VPLMN; and managing establishment of the PDU session with the control plane function for session management (e.g. an SMF) in the second network slice of the second VPLMN. Prior to establishing the PDU session, the method may involve receiving, from the UE, a message which indicates a request for establishing an initial PDU session for the UE using the first network slice and, in response, managing establishment of the initial PDU session using the first network slice in the first VPLMN.

In some implementations, the method may further include communicating, with a HPLMN, one or more messages in a subscription authentication for the UE; and obtaining a subscription parameter which indicates support for home network assisted roaming, wherein querying the AF for selection of the control plane function for session management is based on the subscription parameter. In some implementations, the method may further include storing the subscription parameter in memory; and checking the subscription parameter upon receiving the message which indicates the request for establishing the second PDU session for the UE using the second network slice which is not supported or available in the first VPLMN, wherein querying the AF for selection of the control plane function for session management is based on checking the subscription roaming.

In some implementations, the method may further include communicating, with an HPLMN, one or more messages in a subscription authentication for the UE; and obtaining an address of the AF which is configured with support for home network assistance for session establishment, wherein querying the AF for selection of the control plane function for session uses the address of the AF. In some implementations, the method may further include communicating, with an HPLMN, one or more messages in a subscription authentication for the UE; and in the subscription authentication, obtaining an acceptance of the first network slice and the second network slice as allowed network slices. In some implementations, the method may further include sending, to the UE, a message which indicates a registration accept of the first network slice and the second network slice as allowed network slices.

In a further illustrative example, a network node may comprise one or more processors; one or more interfaces to connect for network communication; one or more memory elements for storing instructions executable by the one or more processors for operation as a control plane function entity for mobility management, including for performing the processing/messaging steps of the method(s) as described. In yet another illustrative example, a computer program product may comprise a non-transitory computer readable medium and instructions stored in the non-transitory computer readable medium, where the instructions are executable by one or more processors of a network node having a control plane function entity for mobility management, including for performing the processing/messaging steps of the method(s) as described.

Variations and Implementations

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), VLAN, wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, IoT network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™, mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

In various example implementations, entities for various embodiments described herein can encompass network elements (which can include virtualized network elements, functions, etc.) such as, for example, network appliances, forwarders, routers, servers, switches, gateways, bridges, loadbalancers, firewalls, processors, modules, radio receivers/transmitters, or any other suitable device, component, element, or object operable to exchange information that facilitates or otherwise helps to facilitate various operations in a network environment as described for various embodiments herein. Note that with the examples provided herein, interaction may be described in terms of one, two, three, or four entities. However, this has been done for purposes of clarity, simplicity and example only. The examples provided should not limit the scope or inhibit the broad teachings of systems, networks, etc. described herein as potentially applied to a myriad of other architectures.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

Each example embodiment disclosed herein has been included to present one or more different features. However, all disclosed example embodiments are designed to work together as part of a single larger system or method. This disclosure explicitly envisions compound embodiments that combined multiple previously-discussed features in different example embodiments into a single system or method.

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A method for use in facilitating concurrent access to services in a first visited public land mobile network (VPLMN) and a second VPLMN for a user equipment (UE), the method comprising:
at a control plane function for mobility management operative for use in the first VPLMN,
receiving, from the UE, a message which indicates a registration request for registration using a first network slice and a second network slice;
managing registration of the UE in response to the registration request that includes obtaining, through a subscription authentication for the UE, an acceptance of the first network slice and the second network slice as allowed network slices for the UE and also obtaining a subscription parameter for the UE, the subscription parameter for the UE being set to indicate that home network assisted roaming is supported for the UE and the subscription parameter for the UE includes an address identifying an application function (AF) that is to support the home network assisted roaming, wherein the second network slice is not supported or available in the first VPLMN;
receiving, from the UE, a message which indicates a request for establishing a protocol data unit (PDU) session for the UE using the second network slice; and
for the second network slice that is not supported or available in the first VPLMN and based on the subscription parameter for the UE being set to indicate that home network assisted roaming is supported for the UE, forwarding, by the control plane function for mobility management in the first VPLMN, the request for establishing the PDU session to the AF using the address identifying the AF that is included in the subscription parameter for the UE, wherein the AF is configured to manage establishment of the PDU session for the UE using the second network slice in the second VPLMN.

2. The method of claim 1, further comprising:
at the control plane function for mobility management operative for use in the first VPLMN,
receiving, from the UE, a message which indicates a request for establishing an initial PDU session for the UE using the first network slice and, in response, managing establishment of the initial PDU session using the first network slice in the first VPLMN.

3. The method of claim 1, further comprising:
at the control plane function for mobility management operative for use in the first VPLMN,
communicating, with a home public land mobile network (HPLMN), one or more messages in the subscription authentication for the UE; and
obtaining the subscription parameter for the UE.

4. The method of claim 3, further comprising:
at the control plane function for mobility management operative for use in the first VPLMN,
storing the subscription parameter in memory; and
checking the subscription parameter upon receiving the message which indicates the request for establishing the second PDU session for the UE using the second network slice which is not supported or available in the first VPLMN.

5. The method of claim 1, further comprising:
at the control plane function for mobility management operative for use in the first VPLMN,
communicating, with a home public land mobile network (HPLMN), one or more messages in the subscription authentication for the UE; and
sending, to the UE, a message which indicates a registration accept of the first network slice and the second network slice as allowed network slices.

6. The method of claim 1, wherein the AF is configured to manage establishment of the PDU session for the UE which includes performing selection of a control plane function for session management in the second network slice of the second VPLMN.

7. The method of claim 1, wherein the control plane function for mobility management operative for use in the first VPLMN comprises an access and mobility management function (AMF).

8. A network node comprising:
one or more processors;
one or more interfaces to connect in a mobile network; and
one or more memory elements for storing instructions executable by the one or more processors for operation as a control plane function for mobility management in a first visited public land mobile network (VPLMN), including for use in facilitating concurrent access to services in the first VPLMN and a second VPLMN for a user equipment (UE) by:
receiving, from the UE, a message which indicates a registration request for registration using a first network slice and a second network slice;
managing registration of the UE in response to the registration request that includes obtaining, through a subscription authentication for the UE, an acceptance of the first network slice and the second network slice as allowed network slices for the UE and also obtaining a subscription parameter for the UE, the subscription parameter for the UE being set to indicate that home network assisted roaming is supported for the UE and the subscription parameter for the UE includes an address identifying an application function (AF) that is to support the home network assisted roaming, wherein the second network slice is not supported or available in the first VPLMN;
receiving, from the UE, a message which indicates a request for establishing a protocol data unit (PDU) session for the UE using the second network slice; and
for the second network slice that is not supported or available in the first VPLMN and based on the subscription parameter for the UE being set to indicate that home network assisted roaming for the UE is supported, forwarding the request for establishing the PDU session to the AF using the address identifying the AF that is included in the subscription parameter for the UE, wherein the AF that is configured to manage establishment of the PDU session for the UE using the second network slice in the second VPLMN.

9. The network node of claim 8, wherein the instructions executable by the one or more processors for operation as the control plane function for mobility management including for:
receiving, from the UE, a message which indicates a request for establishing an initial PDU session for the UE using the first network slice and, in response, managing establishment of the initial PDU session using the first network slice in the first VPLMN,
wherein the initial PDU session and the PDU session of the UE are both maintained through a gNodeB (gNB) utilized for communications in the first VPLMN.

10. The network node of claim 8, wherein the instructions executable by the one or more processors for operation as the control plane function for mobility management including for:
communicating, with a home public land mobile network (HPLMN), one or more messages in the subscription authentication for the UE; and
obtaining the subscription parameter for the UE.

11. The network node of claim 10, wherein the instructions executable by the one or more processors for operation as the control plane function for mobility management including for:
storing the subscription parameter in memory; and
checking the subscription parameter upon receiving the message which indicates the request for establishing the second PDU session for the UE using the second network slice which is not supported or available in the first VPLMN.

12. The network node of claim 8, wherein the instructions executable by the one or more processors for operation as the control plane function for mobility management including for:
communicating, with a home public land mobile network (HPLMN), one or more messages in the subscription authentication for the UE; and
sending, to the UE, a message which indicates a registration accept of the first network slice and the second network slice as allowed network slices.

13. The network node of claim 8, wherein the control plane function for mobility management operative for use in the first VPLMN comprises an access and mobility management function (AMF).

14. The network node of claim 8, wherein the AF is configured to manage establishment of the PDU session for the UE which includes performing selection of a control plane function for session management in the second network slice of the second VPLMN.

15. A method for use in facilitating concurrent access to services in a first visited public land mobile network (VPLMN) and a second VPLMN for a user equipment (UE), the method comprising:
at a control plane function for mobility management operative for use in the first VPLMN,
receiving, from the UE, a message which indicates a registration request for registration using a first network slice and a second network slice;
managing registration of the UE in response to the registration request that includes obtaining, through a subscription authentication for the UE, an acceptance of the first network slice and the second network slice as allowed network slices for the UE and also obtaining a subscription parameter for the UE, the subscription parameter for the UE being set to indicate that home network assisted roaming for the UE is supported and the subscription parameter for the UE includes an address identifying an application function (AF) that is to support the home network assisted roaming, wherein the second network slice is not supported or available in the first VPLMN;
receiving, from the UE, a message which indicates a request for establishing a protocol data unit (PDU) session for the UE using the second network slice;
for the second network slice that is not supported or available in the first VPLMN and based on the subscription parameter indicating support for home network assisted roaming for the UE, querying, by the control plane function for mobility management in the first VPLMN and using the address identifying the AF that is included in the subscription parameter for the UE, the AF for selection of a control plane function for session management in the second network slice of a second VPLMN; and
managing establishment of the PDU session with the control plane function for session management in the second network slice of the second VPLMN.

16. The method of claim 15, comprising:
at the control plane function for mobility management operative for use in the first VPLMN,
receiving, from the UE, a message which indicates a request for establishing an initial PDU session using the first network slice and, in response, managing establishment of the initial PDU session using the first network slice in the first VPLMN.

17. The method of claim 15, further comprising:
at the control plane function for mobility management operative for use in the first VPLMN,
communicating, with a home public land mobile network (HPLMN), one or more messages in the subscription authentication for the UE; and
obtaining the subscription parameter for the UE.

18. The method of claim 17, further comprising:
at the control plane function for mobility management operative for use in the first VPLMN,
storing the subscription parameter in memory; and
checking the subscription parameter upon receiving the message which indicates the request for establishing the PDU session for the UE using the second network slice which is not supported or available in the first VPLMN.

19. The method of claim 15, further comprising:
at the control plane function for mobility management operative for use in the first VPLMN,
communicating, with a home public land mobile network (HPLMN), one or more messages in the subscription authentication for the UE; and
sending, to the UE, a message which indicates a registration accept of the first network slice and the second network slice as allowed network slices.

20. The method of claim 15, wherein:
the control plane function for mobility management comprises an access and mobility management function (AMF), and the control plane function for session management comprises a session management function (SMF).

\* \* \* \* \*